(12) United States Patent
Robinson et al.

(10) Patent No.: US 8,676,663 B1
(45) Date of Patent: Mar. 18, 2014

(54) PROVIDING RECOMMENDATIONS TO HOSPITALITY CUSTOMERS

(71) Applicant: Monscierge, LLC, Oklahoma City, OK (US)

(72) Inventors: Marcus Lee Robinson, Edmond, OK (US); Nathaniel Paul Lewis, Madison, WI (US); John Spencer Ready, Oklahoma City, OK (US); Kenneth Richard Marold, Norman, OK (US); James Russell Texter, III, Jenks, OK (US)

(73) Assignee: Monscierge, Inc., Oklahoma City, OK (US)

( * ) Notice: Subject to any disclaimer, the term of this patent is extended or adjusted under 35 U.S.C. 154(b) by 0 days.

(21) Appl. No.: 13/925,695

(22) Filed: Jun. 24, 2013

Related U.S. Application Data

(63) Continuation-in-part of application No. 13/842,367, filed on Mar. 15, 2013, and a continuation-in-part of application No. 13/842,177, filed on Mar. 15, 2013.

(60) Provisional application No. 61/817,772, filed on Apr. 30, 2013.

(51) Int. Cl.
*G06Q 30/00* (2012.01)
(52) U.S. Cl.
USPC .................. 705/26.1; 705/27.1; 705/14.1
(58) Field of Classification Search
USPC ...................... 705/26.1, 27.1, 14.1
See application file for complete search history.

(56) References Cited

U.S. PATENT DOCUMENTS

| | | | |
|---|---|---|---|
| 7,478,055 B2 | 1/2009 | Goino | |
| 7,945,477 B2 | 5/2011 | Werbitt | |
| 8,107,934 B1 | 1/2012 | Harris et al. | |
| 8,131,586 B2 | 3/2012 | Cordeiro | |
| 8,160,614 B2 | 4/2012 | Shaffer et al. | |
| 8,315,910 B2 | 11/2012 | Goino | |
| 2001/0056396 A1 | 12/2001 | Goino | |
| 2002/0142841 A1 | 10/2002 | Boushy | |

(Continued)

FOREIGN PATENT DOCUMENTS

| | | |
|---|---|---|
| EP | 1 569 096 A1 | 8/2005 |
| JP | 2003-308371 A | 10/2003 |
| JP | 2007-334901 A | 12/2007 |

OTHER PUBLICATIONS

Monscierge Delivers MasterCard's First-Ever Credible Recommendation Network: JFK Airport's MasterCard Lounge joins a growing number of travel/hospitality hotspots offering this interactive, touch-screen concierge solution, PR Newswire [New York] Dec. 19, 2011. Downloaded from ProQuestDirect on the Internet on Sep. 12, 2013, 2 pages.*

(Continued)

*Primary Examiner* — James Zurita
(74) *Attorney, Agent, or Firm* — Sterne, Kessler, Goldstein & Fox P.L.L.C.

(57) ABSTRACT

Method, system, and computer program product embodiments are disclosed for providing recommendations to hospitality customers. Defining steps include establishing a connection with a customer's mobile device, obtaining information about the location of the customer's mobile device, determining recommended goods or services currently offered by one or more business locations, and outputting for display on the customer's mobile device a listing of the recommended goods or services navigable by category or subcategory.

22 Claims, 27 Drawing Sheets

(56) References Cited

U.S. PATENT DOCUMENTS

| | | |
|---|---|---|
| 2007/0038727 A1 | 2/2007 | Bailey et al. |
| 2009/0012865 A1* | 1/2009 | Celik .............................. 705/14 |
| 2009/0037257 A1* | 2/2009 | Stuckey et al. ................. 705/10 |
| 2009/0119187 A1 | 5/2009 | Goino |
| 2009/0216547 A1 | 8/2009 | Canora et al. |
| 2010/0070387 A1 | 3/2010 | Anderson et al. |
| 2011/0106721 A1 | 5/2011 | Nickerson et al. |
| 2011/0218930 A1 | 9/2011 | Black |

OTHER PUBLICATIONS

Monscierge Chosen for First-Ever Exclusive Technology Exhibit: Only 94 companies will debut in the new C.E.S. tech-zone; Monscierge, selected by Dell, produces the interactive touch-screens seen popping up worldwide in trendy travel/hospitality venues, PR Newswire [New York] Jan. 12, 2012. Downloaded from ProQuestDirect on the Internet on Sep. 12, 2013.*

Co-pending U.S. Appl. No. 13/925,707 inventors Robinson et al., filed Jun. 24, 2013 (Not Published).

English-Language Abstract for Japanese Patent Publication No. JP 2003-308371 A, published Oct. 31, 2003; 2 pages.

English-Language Abstract for Japanese Patent Publication No. JP 2007-334901 A, published Dec. 27, 2007; 2 pages.

* cited by examiner

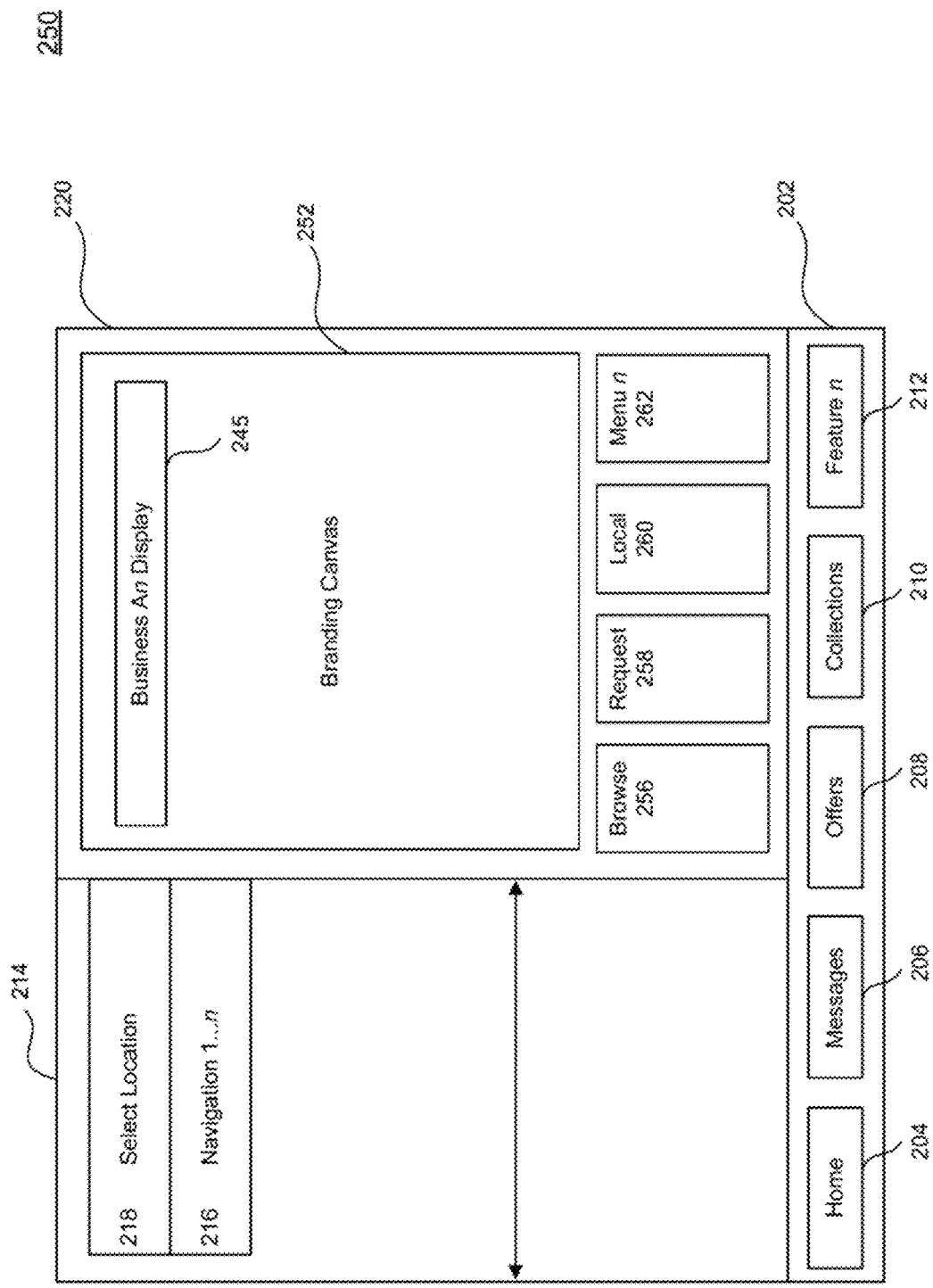

Console: Local Recommendations: Home
Users click the Local Recommendations button on the left to see and manage their Recommendation Network.

Console: Local Recommendations: Casual Dining
Users click on a category to see the businesses listed in it.

Connect: Local: Recommendations
Guests press the Recommendations button to browse categories.

Connect: Local
Guests press the Local button to get to the Recommendations section.

Connect: Local: Recommendations: Casual Dining: American

After guests choose their category or subcategory, they can see the merchants listed.

Connect: Local: Recommendations: Casual Dining

Guests can browse subcategories

Console: Recommendations:
Casual Dining

Guests can browse recommended casual dining merchants, or choose a subcategory with the Subcategories button

Lobby: Recommendations

Guests can browse recommendation categories

Console: Local Recommendations: Add New Merchant
To add a new merchant, users click the Add New Merchant button at the top of the screen.

Console: Local Recommendations: Add New Merchant
Users enter the information for the new recommended merchant, then click OK.

Email: New Merchant Request

After users submit a new recommended merchant, they receive an email notifying them that their request has been submitted for approval by the Monscierge research department.

Email: New Merchant Request

The Monsoierge Research Team receives an email notifying them a new recommended merchant has been requested by a Console user. They can then approve it by adding the merchant to the Recommendation Network through SalesForce.com (images 13-15), or they can deny the request.

SalesForce: Create New Enterprise
The Monscierge Research Team can add a new recommended merchant here.

FIG. 9B

SalesForce: Create New Enterprise
The Research Team fills in the form with the name, description, contact information, website, Cluster assignment (each hotel is assigned to a Cluster), category, and location information. The team also selects an image for each merchant.

SalesForce: New Enterprise
After the merchant is added and an image is selected, the Research team can see the enterprise and make any necessary edits.

Console: Local Recommendations: Clarke's
Users can click on the merchant to see the details listed below.

Connect: Local: Recommendations: Casual Dining: American: Clarke's

Guests can click on the new listing to see the details

Connect: Local: Recommendations: Casual Dining American

The new merchant shows up in the Connect Recommendation listings under the selected category

Connect: Local: Recommendations: Casual Dining: American: Clarke's

This is the continuation of Image 17. Guests scroll down to view merchant details.

Lobby: Recommendations: Casual Dining

Clarke's is now seen in the Recommendations list. The list is sorted by proximity to the hotel

Lobby: Recommendations: Casual Dining: Clarke's

When guests click on a merchant listing, they can see images and detailed information about the business.

Console: Local Recommendations: Clarke's
Users can choose to designate a recommendation as Hotel Recommended. This will bring it to the top of the merchant listings (see image 20).

Lobby: Recommendations: Casual
Dining: Clarke's

A Hotel Recommended merchant is given a Hotel Recommended ribbon and is listed at the top of its category

Lobby: Recommendations: Hotel
Recommended: Clarke's

After the recommendation is selected as Hotel Recommended, it is listed in the Hotel Recommended category.

PROVIDING RECOMMENDATIONS TO HOSPITALITY CUSTOMERS

CROSS-REFERENCE TO RELATED APPLICATIONS

This application claims benefit of U.S. Provisional Application No. 61/817,772, filed Apr. 30, 2013, entitled "Providing Recommendations to Hospitality Customers," the contents of which are incorporated herein by reference in their entirety.

BACKGROUND

Hotels and hospitality vendors may offer goods, services, and recommendations to their customers. Hotels and hospitality vendors may employ staff dedicated to concierge services and/or develop extensive customer service operations. However, making goods, services, and recommendations known to customers has proved challenging. Moreover, offers and recommendations may change frequently. As a result, customers are not able to interact with current information about offers and recommendations.

BRIEF SUMMARY

Embodiments described herein include various method, system, and computer program product embodiments, and combinations and sub-combinations thereof, for providing recommendations to hospitality customers. In an example embodiment, providing recommendations to hospitality customers using a recommendation management system includes establishing a connection with a customer's mobile device, obtaining information about the location of the customer's mobile device, providing to the customer's mobile device a set of data describing recommended goods or services currently offered by one or more business locations, and displaying on the customer's mobile device a listing of the recommended goods or services navigable by category or subcategory. Further embodiments are described in the accompanying description below.

BRIEF DESCRIPTION OF THE DRAWINGS

The accompanying drawings are incorporated herein and form a part of the specification.

FIG. 2B is a block diagram of an example interface for providing a customizable brand display to a customer's mobile device, according to an example embodiment.

FIGS. 5A-5B, 6A-6F, 7A-7B, 8A-8B, 9A-9C, 10A-10B, 11A-G, and 12A-12B show examples of interfaces relating to providing recommendations.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for providing recommendations to hospitality customers using a recommendation management system.

By way of non-limiting example, and not of limitation, the terms "customer" and "consumer" and any plural forms thereof may be used interchangeably to refer to natural persons as well as corporate or commercial customers, such as, for example, a business. Customers may include a guest of a hotel, hospitality vendor, and/or business.

The terms "business," "service provider," "commercial outlet," "merchant," and "vendor" may be used interchangeably to mean any person, entity, distribution system, software and/or hardware provider, broker and/or any other entity in the distribution chain of goods and/or services, commercial or otherwise. By way of example, not of limitation, a business may be a hotel, restaurant, retail establishment, airline, automobile dealership, travel agency, organization (e.g., non-profit), on-line merchant, and/or other business. While a hotel and/or a hospitality vendor are frequently referred to throughout herein, one having skill in the relevant art(s) would understand that other industries and businesses are contemplated.

By way of example, not of limitation, a customer may communicate and interact with a business in person, telephonically, and/or electronically, such as, for example, by using a computer connected to the Internet, a mobile device connected to the Internet, a local or wide area network, a telecommunications network, or any combination thereof. Communication and interaction may occur synchronously or asynchronously. A business may offer goods and/or services using one or more forms of interaction. A business may offer a customer the option of paying for goods and/or services using transaction accounts such as, for example, those associated with a credit line, debit account, loyalty program, and/or other form of financial processing method known or later developed.

TABLE OF CONTENTS (a) Recommendation Management System Architecture . . . 3
(b) Providing Recommendations to Hospitality Customers . . . 13
(c) System for Providing Recommendations . . . 17
(d) Method for Providing Recommendations . . . 23
(e) Example Computing Devices . . . 26
(f) Conclusion . . . 29

(A) RECOMMENDATION MANAGEMENT SYSTEM ARCHITECTURE

Figure 1A:
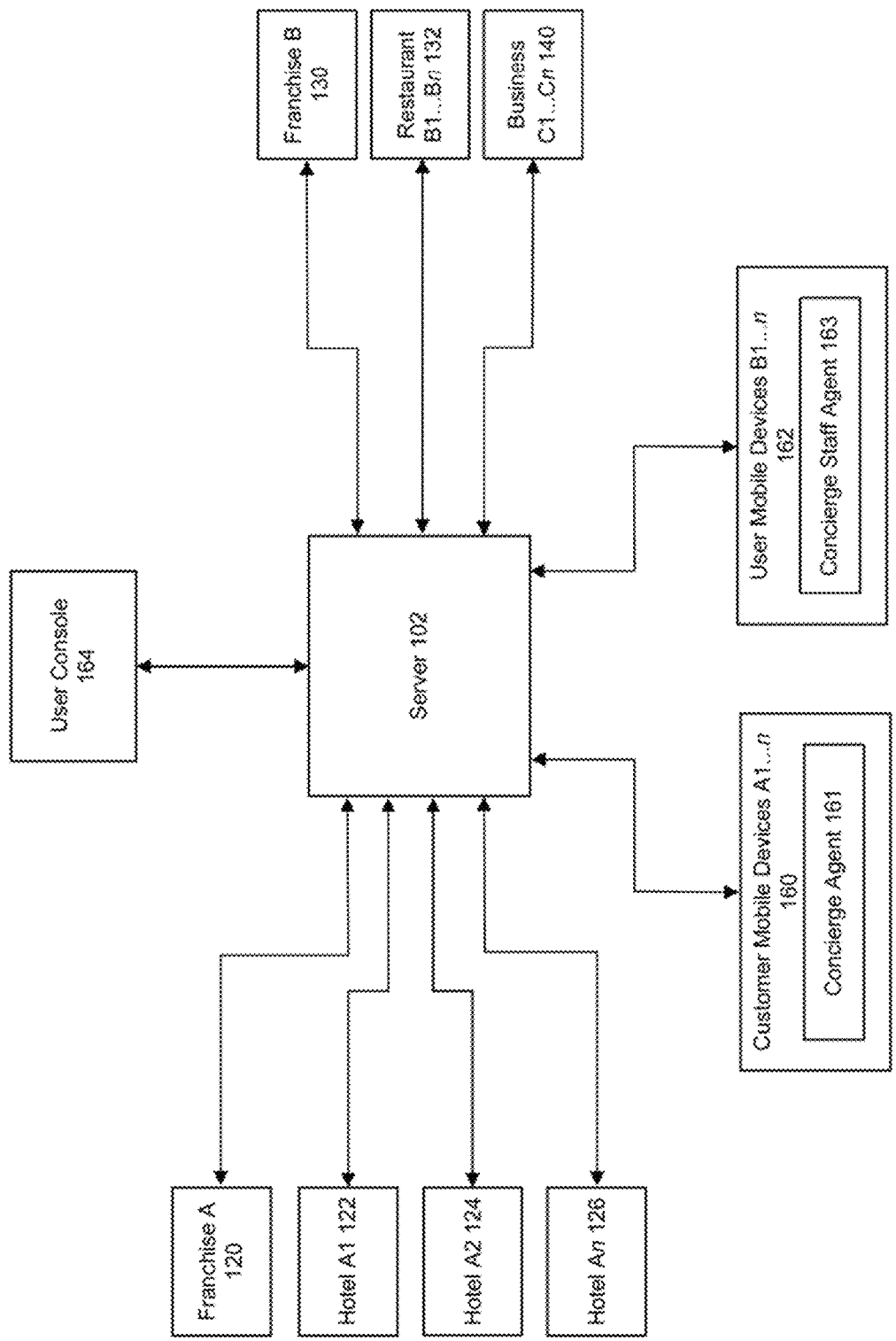
FIG. 1A is a block diagram of a server and clients, according to an example embodiment.

FIG. 1A shows an example system architecture 100 for establishing a connection between one or more business entities and one or more customer mobile phone devices. In an example embodiment, a business entity includes a franchise A 120. Franchise A 120 may be comprised of one or more hotels, such as, for example, hotel A1 122, hotel A2 124, and hotel An 126. Hotel A1 122, hotel A2 124, and hotel An 126 represent particular hotel locations which are, for example, part of a chain and/or commonly branded series of establishments associated with one or more franchises A 120. Franchise A 120 may be a brand or a sub-brand of a brand, and so on. Hotel A1 122, hotel A2 124, and hotel An 126 may be commonly branded to associate particular hotel locations with franchise A 120.

In an example embodiment, franchise B 130 is a business entity. Franchise B 130 may be comprised of one or more, for example, restaurants B1 . . . Bn 132. Restaurants B1 . . . Bn 132 may represent particular restaurant locations which are, for example, part of a chain and/or commonly branded series of establishments associated with one or more franchises B 130. Franchise B 130 may be a brand or a sub-brand of a brand, and so on. Restaurants B1 . . . Bn 132 may be commonly branded to associate particular restaurant locations with franchise B 130. One having skill in the relevant art(s) would appreciate that restaurants B1 . . . Bn 132 may include, but are not limited to, entities involved in food vending, food preparation, food service, and/or hospitality industries such as, for example, fine dining establishments, fast food restaurants, family style restaurants, diners, rest stops, caterers, bars, grills, lounges, food delivery services, and/or other businesses which offer food.

In an example embodiment, businesses C1 . . . Cn 140 may represent one or more businesses offering goods and/or services to customers related to, for example, hospitality and/or local attractions, such as, for example, gift shops, book and music stores, apparel, accessories (e.g., jewelry, handbags, shoes), department stores, shopping malls, florists, grocery stores, tobacco, alcohol, cleaners, banks, sporting goods, electronics, hardware stores, amusement parks, outdoor (e.g., animals, wildlife, zoos, parks), sports and leisure (e.g., golf, tennis), spectatorship (e.g., sports arenas), historical landmarks, museums, art and culture, music, performing arts, crafts, movies, shopping, beauty, fitness, nail care, hair salons, barbers, spas, yoga studios, tanning, candy shops, toy stores, nightclubs, bars, lounges, casinos, pool halls, dancehalls, wine bars, microbreweries, distilleries, rental cars, airport transportation services, automotive services, taxis, trains, shuttles, insurance, pharmacies, printing and shipping, colleges, libraries, and/or religious institutions. One having skill in the relevant art(s) will appreciate that businesses C1 . . . Cn 140 may involve other categories of goods and services not listed above and need not be tied to hospitality.

In an example embodiment, one or more businesses C1 . . . Cn 140 have business relationships with franchise A 120 and/or one or more of hotel A1 122, hotel A2 124, and hotel An 126. Relationships may include agreements to promote goods or services offered by businesses C1 . . . Cn 140 to hotel customers. Such relationships may be established at the level of franchise A 120 and/or at the level of individual hotel A1 122, hotel A2 124, and/or hotel An 126. In an example embodiment, a recommendation network comprises a collection of relationships between businesses C1 . . . Cn 140, franchise B 130, restaurants B1 . . . Bn 132, franchise A 120, hotel A1 122, hotel A2 124, and/or hotel An 126. Such a recommendation network may be used to connect customers with promotions and offers based on, for example, location, behavior, and/or cross-promotional agreements.

In an example embodiment, a server 102 stores and processes information related to one or more of franchise A 120, hotel A1 122, hotel A2 124, hotel An 126, franchise B 130, restaurants B1 . . . Bn 132, and/or businesses C1 . . . Cn 140, collectively referred to as users. Users of server 102 may have partnerships, associations, and/or relationships with each other. Users of server 102 may operate independently of each other, in competition with each other, and/or according to commercial agreements.

In an example embodiment, one or more customers are connected to server 102 by customer mobile devices A1 . . . n 160. Customer mobile devices A1 . . . n 160 may include mobile computing devices (e.g., smart phones, mobile phones, personal digital assistants, tablets, electronic readers). Customer mobile devices A1 . . . n 160 are configured to send information to and receive information from server 102. Customer mobile devices A1 . . . n 160 may include operating systems operable to download and install one or more mobile applications such as, for example, a mobile application downloaded from an application store. Such applications may be configured to display data stored and/or processed on server 102. A display of information may be dynamic or static. Customer mobile devices A1 . . . n 160 may include a browser. A browser is operable to render web pages and/or to support operation of web applications. Data sent to and received from customer mobile devices A1 . . . n 160 may be displayed using a native application and/or a web application. Customer mobile devices A1 . . . n 160 may be identified by server 102 by a unique serial number, phone number, and/or a mobile identification number (MIN).

In an embodiment, customer mobile devices A1 . . . n 160 each include a concierge agent 161. In one example not intended to be limiting, concierge agent 161 is a mobile application that can operate as described herein to communicate with server 102 and provide one or more displays to a customer. These displays display data sent from server 102 and can include interfaces where a user can make selections and input data for sending to server 102. In this way, according to a feature, a variety of concierge and hospitality services can be provided to serve a customer through concierge agent 161.

In an example embodiment, one or more users are connected to server 102 by user mobile devices B1 . . . n 162. User mobile devices B1 . . . n 162 may be issued to staff of one or more of franchise A 120, hotel A1 122, hotel A2 124, hotel An 126, franchise B 130, restaurants B1 . . . Bn 132, and/or businesses C1 . . . Cn 140. For example, hotels may issue, distribute, or otherwise provide mobile devices to managers, staff members, and/or other employees. User mobile devices B1 . . . n 162 may include mobile computing devices (e.g., smart phones, mobile phones, personal digital assistants, tablets, electronic readers). User mobile devices B1 . . . n 162 are configured to send information to and receive information from server 102. User mobile devices B1 . . . n 162 may include operating systems operable to download and install mobile applications, such as, for example, a mobile application downloaded from an application store. Such applications are configured to display data stored and processed on server 102. Display of information on user mobile devices B1 . . . n 162 may be dynamic or static. User mobile devices B1 . . . n 162 may include a browser. A browser is operable to render web pages and/or support web applications, for example, on a mobile device. Data sent to and received from user mobile devices B1 . . . n 162 may be displayed using a native application and/or a web application. User mobile devices B1 . . . n 162 may be identified by server 102 using a unique serial number, phone number, and/or a mobile identification number (MIN).

In an embodiment, user mobile devices B1 . . . n 162 each include a concierge staff agent 163. In one example not intended to be limiting, concierge staff agent 163 is a mobile application that can operate as described herein to communicate with server 102 and provide one or more displays to a staff user of a business responsible for handling customer requests. These displays display data sent from server 102 and can include interfaces where a staff user can make selections and input data for sending to server 102. In this way, according to a feature, a staff user can fulfill requests relating to a variety of concierge and hospitality services through concierge agent 163 to serve customers.

In an example embodiment, server 102 is configured to allow interaction with one or more users authorized to offer goods and/or services to customers. For example, one or more employees responsible for designing promotions may be authorized to create and/or release offers for redemption and/or fulfillment. Design and release of offers is facilitated by providing access to a user console 164. User console 164 may provide access to data stored on server 102. In an example embodiment, user console 164 receives inputs from authorized users. Users may be authenticated by verifying a username and password. One having skill in the relevant art(s) would appreciate that other forms of access control may be used. In an example embodiment, a marketing executive may be given authorization to set permissions for one or more employees to create, modify, and/or delete information associated with a user account for franchise A 120. An employee or group of employees may be tasked with creation and/or release of promotions designed and/or preformatted for distribution to customers. For example, an employee may be tasked with identifying and/or describing goods and/or services available and/or offered to customers. Offers may be displayed on customer mobile devices A1 . . . n 160.

In an example embodiment, to interact with server 102 and/or to provide input to user console 164, employees/staff may receive individual user accounts. User console 164 may serve as access control for server 102. Access control includes but is not limited to assigning role-based privileges, such as those defined by an executive or staff manager. Privileges may be associated with individual user accounts assigned to, for example, staff members. Privileges may reflect authorization to create, modify, and/or delete records and data on server 102. Privileges may thus be assigned based on a staff member's role and/or status. Individual staff members may be grouped and re-grouped based on other criteria.

In an example embodiment, user console 164 controls access to and modification of data stored on server 102. For example, authorized users may populate and/or release promotional templates, designs, and/or customizable made available by server 102. In an example embodiment, user console 164 comprises a web based portal accessible to users who provide valid login credentials such as, for example, a username and password. Such a portal may display user interface components such as, for example, viewers, navigation, controllers, form fields, buttons, drag-and-drop, design templates, and other components which may facilitate performance of marketing workflow.

In an example embodiment, user console 164 is a browser-based web application. In an example embodiment, user console 164 is a native application configured to launch and operate, for example, on a tablet and/or mobile phone. In an example embodiment, user console 164 is an executable file configured to launch and operate in an environment where inputs may be received and outputs displayed to a user with or without access to a network connection, for example, which is synchronized when a connection is available.

Figure 1B:
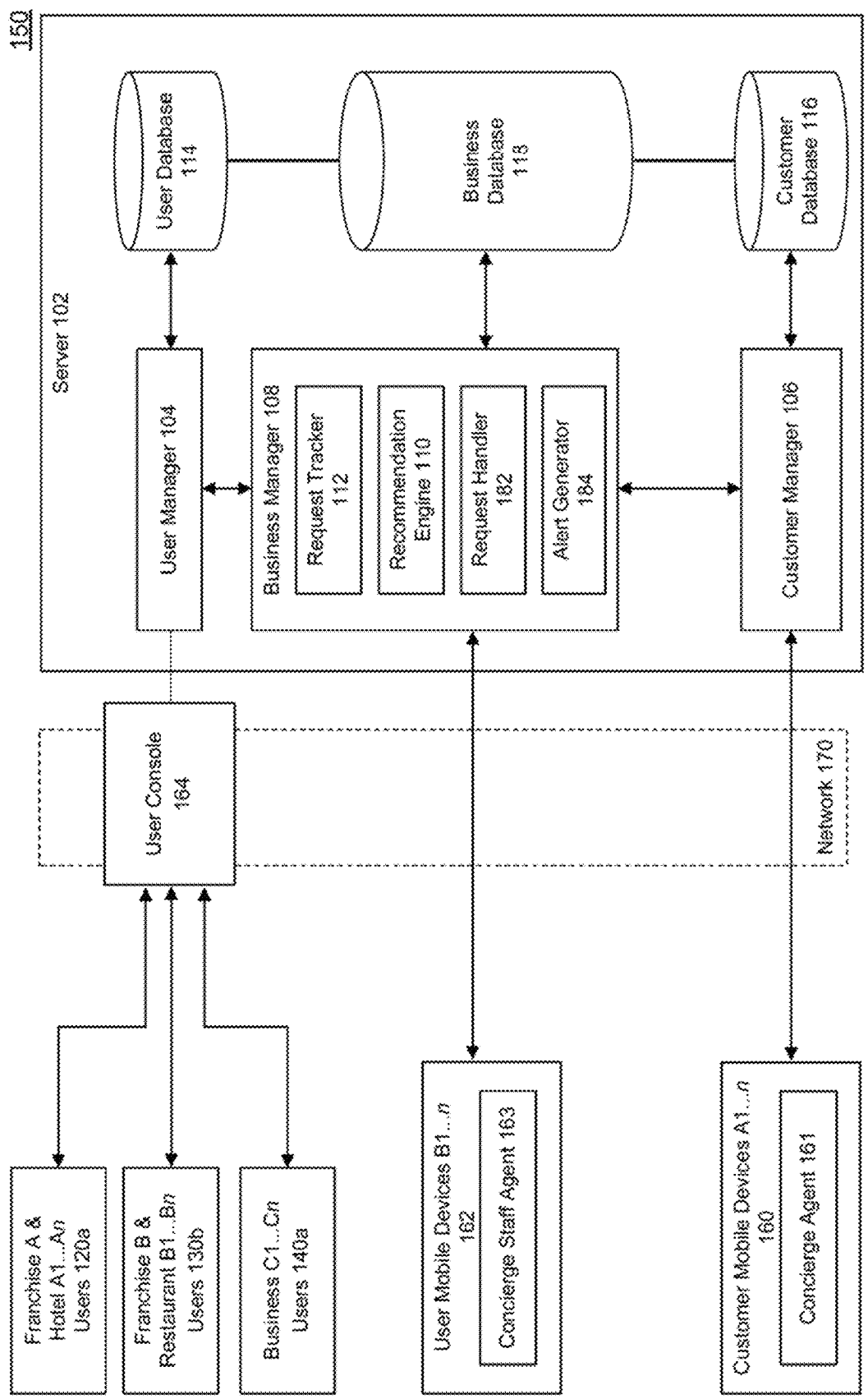
FIG. 1B is a block diagram of a recommendation management system, according to an example embodiment.

FIG. 1B shows a recommendation management system 150. Recommendation management system 150 may include one or more clients connected to server 102 over a network 170. In an example embodiment, recommendation management system 150 includes architecture distributed over one or more networks, such as, for example, a cloud computing architecture. Cloud computing includes but is not limited to distributed network architectures for providing, for example, software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), API as a service (APIaaS), integration platform as a service (IPaaS), etc.

In an example embodiment, one or more clients connected to server 102 include franchise A and hotel A1 . . . An users 120a, franchise B and restaurant B1 . . . Bn users 130b, business C1 . . . Cn users 140a, customer mobile devices A1 . . . n 160, and/or user mobile devices B1 . . . n 162. Network 170 includes but is not limited to a local/wide area network, wireless local area network, telecommunications network, or any combination thereof.

In an example embodiment, server 102 includes a user manager 104 connected to a user database 114. Franchise A and hotel A1 . . . An users 120a, franchise B and restaurant B1 . . . Bn users 130b, and/or business C1 . . . Cn users 140a may connect with user manager 104 over network 170. User manager 104 may output requested data and/or push data to user console 164. In an example embodiment, user console 164 is accessible to franchise A and hotel A1 . . . An users 120a, franchise B and restaurant B1 . . . Bn users 130b, and/or business C1 . . . Cn users 140a and user manager 104 may receive, process, and/or manage input provided using user console 164. User inputs may be stored in user database 114.

In an example embodiment, user database 114 stores data such as, for example, user account information, access control privileges, preferences, settings, and/or payment processing information. For example, franchise A and hotel A1 . . . An users 120a establish one or more accounts for connecting with server 102. Such accounts may be linked to one or more methods of payment such as, for example, a credit line. Payments, fees, dues for membership, and/or other forms of compensation may thus be collected for use of recommendation management system 150 and/or the recommendation network.

In an example embodiment, a business database 118 processes and/or warehouses data relating to businesses such as franchise A and hotel A1 . . . An users 120a, franchise B and restaurant B1 . . . Bn users 130b, and/or business C1 . . . Cn users 140a. Such information may include but is not limited to geolocation, offered goods and/or services, classification of goods and/or services, hours of operation, associations with other businesses on, for example, the recommendation network, logs of activity associated with customer mobile devices A1 . . . n 160, indications provided by customers recommending a business, and/or other indicia. One having skill in the relevant art(s) will appreciate that business database 118 and associated data structures may include other types of indicia, criteria, and metrics useful for indexing and warehousing information about one or more businesses.

In an example embodiment, server 102 includes a business manager 108. Business manager 108 is connected to business database 118. In an example embodiment, business manager 108 includes a recommendation engine 110 and a request tracker 112.

In an example embodiment, business manager 108 may connect with user mobile devices B1 . . . n 162. For example, franchise A and hotel A1 . . . An users 120a, franchise B and restaurant B1 . . . Bn users 130b, and/or business C1 . . . Cn users 140a may input, select, and/or define role-based configurations and privileges for user mobile devices B1 . . . n 162 by interacting with user console 164. Configurations and privileges may be translated, for example, by user manager 104, into rules to be implemented by business manager 108 in the course of facilitating communication with user mobile devices B1 . . . n 162.

In an example embodiment, business manager 108 is connected to user manager 104 and may receive data handled by user manager 104 such as, for example, associations between businesses on, for example, a recommendation network. Business manager 108 may be configured to store mappings of such associations in business database 118. User manager 104 may receive data handled by user manager 104 such as, for example, role-based configurations and privileges for user mobile devices B1 . . . n 162. For example, user manager 104 may generate a mapping of role-based configurations and privileges for business manager 108 which may, in tarn, be translated into business rules and the like.

In an example embodiment, business manager 108 may include a recommendation engine 110. Recommendation engine 110 may receive data from customer mobile devices A1 . . . n 160 handled, for example, by a customer manager 106. Such data may include, for example, geolocation, natural language, and/or search criteria in the form of query. In an example embodiment, recommendation engine 110 processes input from customer mobile devices A1 . . . n 160. Input may include a specific request for a recommendation regarding particular goods and/or services (e.g., restaurants, dry cleaning). Recommendation engine 110 may also receive data without input from a customer. For example, recommendation engine 110 may receive contextual information from customer manager 106 such as, for example, location, a history associated with customer mobile devices A1 . . . n, information obtained from an account, and/or data accessible to a server connected to a mobile client.

In an example embodiment, recommendation engine 110 generates query syntax reflecting a decision tree of criteria and prioritization based on, for example, proximity of location, relevance to search terms input or deduced from context triggers, partnerships or promotional agreements, such as those reflected by association with the recommendation network, and/or prediction using one or more algorithms such as, for example, a Bayesian algorithm. Business database 118 returns results. Results returned by business database 118 are processed for display by recommendation engine 110 which may apply additional filtering and/or arrange the results so as to provide, for example, information rich listings. Listings may be further filtered, sorted, and/or arranged by customer manager 106 and/or on customer mobile devices A1 . . . n. Data structures output by recommendation engine 110 may be displayed by a native application or web application.

In an example embodiment, business manager 108 includes a request tracker 112. Request tracker 112 is connected to customer manager 106. Request tracker 112 may be configured to receive data and/or messages generated by concierge agents 161 at customer mobile devices A1 . . . n 160. Request tracker 112 is configured to receive requests received from customer mobile devices A1 . . . n 160 which may be processed by customer manager 106. Request tracker 112 is connected to user mobile devices B1 . . . n 162. Request tracker 112 is configured to receive data and/or messages generated by user mobile devices B1 . . . n 162. In an example embodiment, customer manager 106 and request tracker 112 manage a two-way line of communication between customer mobile devices A1 . . . n 160 and user mobile devices B1 . . . n 162. Customer manager 106 and request tracker 112 coordinate and facilitate such interaction. In a non-limiting example, customer mobile device A1 . . . n 160 having a concierge agent 161 generates a request, customer manager 106 authenticates customer mobile device A1 . . . n 160, request tracker 112 processes the request, and request tracker 112 queues the request based on the type and/or role-based or group settings specified by franchise A and hotel A1 . . . An users 120a, franchise B and restaurant B1 . . . Bn users 130b, and/or business C1 . . . Cn users 140a.

In an embodiment, business manager 104 includes a request handler 182 and alert generator 184. Request handler 182 and alert generator 184 communicate with concierge staff agents 163 at user mobile devices B1 . . . n 162 and can access data on customer requests stored in business database 118. This can include access to requests queued by request tracker 112 based on the type and/or role-based or group settings specified by franchise A and hotel A1 . . . An users 120a, franchise B and restaurant B1 . . . Bn users 130b, and/or business C1 . . . Cn users 140a.

As described further below, request handler 182 communicates with a concierge staff agent 163 to enable a staff user to view one or more displays that allow the staff user of a business to fulfill customer requests. These displays display data are sent from server 102, and in particular request handler 182, and can include interfaces where a staff user can make selections and input data for sending to server 102, and in particular request handler 182. In this way, according to a feature, a staff user can fulfill requests relating to a variety of concierge and hospitality services through concierge agent 163 to serve customers. Similarly, as described below, alert generator 184 also communicates with a concierge staff agent 163 to notify a staff user of pending requests that have exceeded an alert criteria.

In an example embodiment, server 102 includes customer manager 106. Customer manager 106 is connected to a customer database 116. Customer mobile devices A1 . . . n 160 may connect to customer manager 106. Customer manager 106 may output requested information and/or push data to a native and/or web application operating on a customer mobile device A1 . . . n 160. Customer manager 106 may receive, process, and/or manage input provided by customer mobile devices A1 . . . n 160 operating concierge agents 161. Customer manager 106 may also collect data from customer mobile devices A1 . . . n 160 not provided as input such as, for example, geolocation and/or data accessible to a server connected to a mobile client. In an example embodiment, customer database 116 stores customer data such as, for example, a location provided by customers operating customer mobile devices A1 . . . n 160, a location sensed and/or received from a geolocating service accessible upon connecting with one or more customer mobile phone devices A1 . . . n 160, information provided by the customer in a survey and/or other form or inquiry, information not provided by the customer but known, accessible, or otherwise available, for example, based on a log or history.

In an example embodiment, customer manager 106 is connected to user manager 104 and business manager 108. User manager 104 accesses information about customers which may be stored in customer database 116. User manager 104 presents information to franchise A and hotel A1 . . . An users 120a, franchise B and restaurant B1 . . . Bn users 130b, and/or business C1 . . . Cn users 140a, for example, as a report displayed on user console 164. Business manager 108 may receive inputs from customer mobile devices A1 . . . n 160 transmitted by customer manager 106. In a non-limiting example, business manager 108 receives geolocation, natural language, and/or search criteria input by a customer into customer mobile phone devices A1 . . . n 160. The input may be processed and/or formatted by customer manager 106. For example, customer manager 106 may transform the input into query syntax and/or provide the input directly to business manager 108. For example, business manager 108 may run one or more queries against business database 118. In turn business database 118 may return results. Results returned by business database 118 may be processed for display by customer manager 106 and may be arranged so as to provide information rich listings to customer mobile devices A1 . . . n 160. Such information rich listings may include results filtered and sorted based on geolocation, a history associated with customer mobile devices A1 . . . n, relevance to search terms, prioritization of results based on associations or promotional agreements, and/or prediction using one or more algorithms such as, for example, a Bayesian algorithm. Data structures output by business manager 108 may be displayed by a native application or web application.

In an example embodiment, system components of server 102 may be coupled to and/or accessed by each other. For example, data from each database may be accessed by each manager on server 102. Furthermore, user database 114, business database 118, and customer database 116 may be linked or otherwise communicatively coupled to allow for searching and asset management across the broader architecture of recommendation management system 150. Moreover, queries may be cached in readily accessible storage, for example, to provide optimization for routinely run queries. Caches may be localized throughout the architecture of recommendation management system 150 based, for example, on available memory.

(B) PROVIDING RECOMMENDATIONS TO HOSPITALITY CUSTOMERS

Figure 2A:
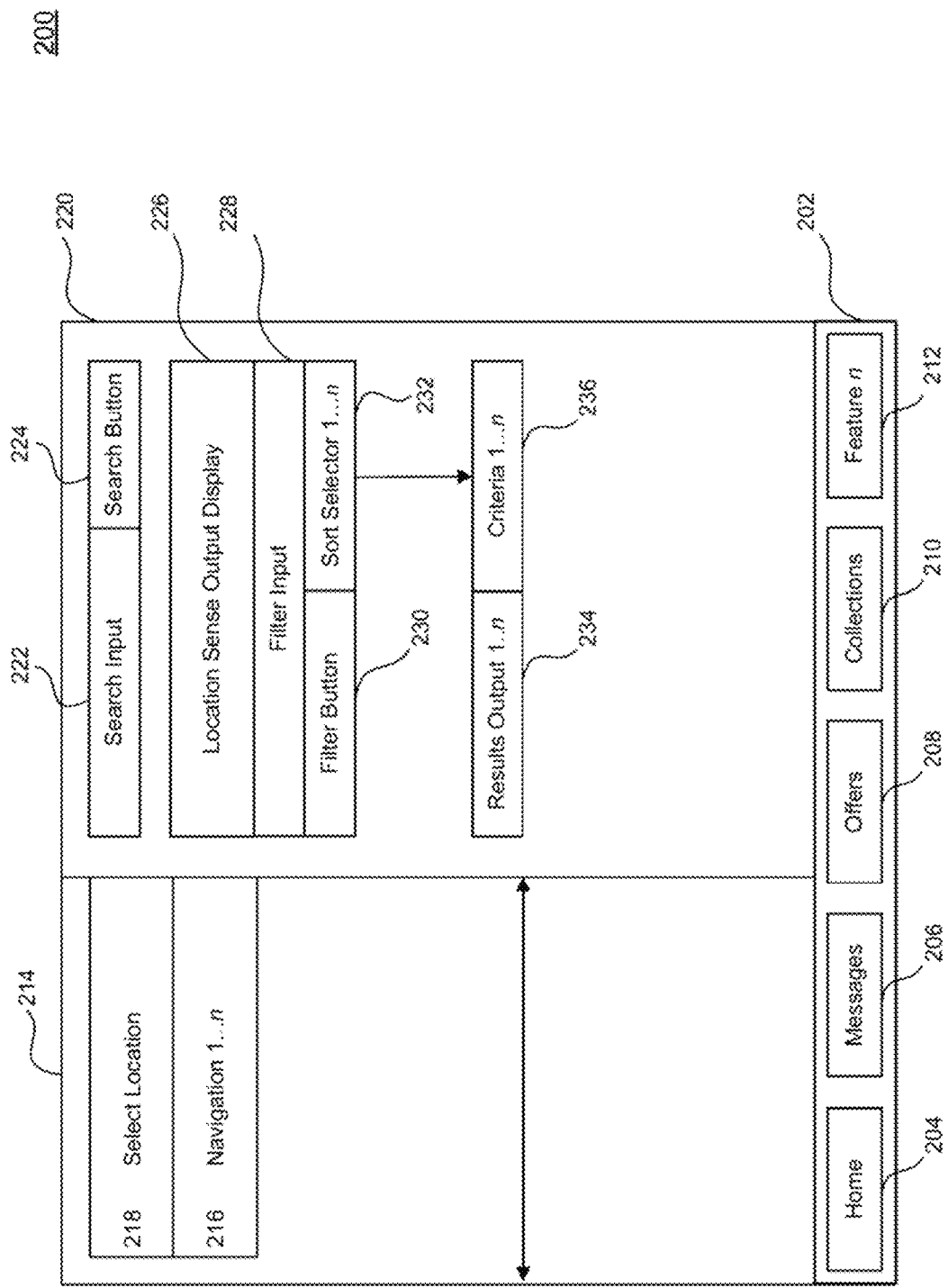
FIG. 2A is a block diagram of an example interface for receiving a selection from a customer's mobile device, according to an example embodiment.

FIG. 2A illustrates an example search interface 200 useful for receiving a location selection from customer mobile devices A1 . . . n 160. In an example embodiment, search interface 200 comprises a global navigation bar 202, a navigation pane 214, and a display area 220. Navigation pane 214 may be minimized, for example, to provide additional or enlarged screen space for display area 220. Global navigation bar 202 includes controllers for accessing one or more interfaces such as a home interface 204, a messages interface 206, an offers interface 208, a collections interface 210, and others represented by feature n 212. Navigation pane 214 may provide sub-navigation useful for accessing one or more interfaces such as, for example, a select location interface 218 and other navigation 1 . . . n 216. Global navigation bar 202 and navigation pane 214 may be displayed in whole or in part across different interfaces. Interfaces may be supported and displayed by a native application or web application operating on customer mobile devices A1 . . . n 160. An interface as used herein generally refers to a display area having one or more images or a display area having one or more images and/or one or more areas with a user-interface element or region that can be selected by a user. Interfaces may be branded or unbranded depending on a particular application or need.

In an example embodiment, customer mobile devices A1 . . . n 160 may view select location interface 218. Select location interface 218 includes a search input element 222 and a search button 224. Customer input of search terms, criteria, and/or natural language into search input element 222 and submission thereof, for example, by executing search button 224, in turn generates one or more requests to server 102.

In an example embodiment, select location interface 218 includes a location sense output display 226. Location sense output display 226 accesses geolocation information stored and/or requested from customer mobile devices A1 . . . n 160. Location sense output display 226 may display information regarding a customer's geolocation. Location sense output 226 may display a message requesting that the customer confirm the information displayed. A customer may confirm the information and/or input different parameters for determining geolocation such as, for example, a zip code, street address, city and/or state, coordinates, and other forms of geolocation such as, for example, landmarks recognizable by one or more geolocating services accessible to and/or provided by server 102.

In an example embodiment, submission of input in search interface 200 generates one or more requests to server 102. In an example embodiment, customer manager 106 receives a request based on search criteria. Customer manager 106 may store information regarding the request in customer database 116. Customer manager 106 may process the request and/or command business manager 108 to generate a query on business database 118. Such a query may return a listing of results based on the search criteria to business manager 108 and/or customer manager 106, either of which may further process and/or manipulate the results to produce information rich listings suitable for presentation on search interface 200. Results are displayed on search interface 200 as results output 1 . . . n 234. Results output 1 . . . n 234 may display corresponding indicia such as criteria 1 . . . n 236 useful for sorting, organizing, and/or arranging results output 1 . . . n 234. Once displayed on search interface 200, results output 1 . . . n 234 may be filtered by a customer using, for example, a filter input 228 to further restrict results output 1 . . . n 234, for example, based on key terms which may be submitted using filter button 230. A customer may sort results output 1 . . . n 234 by one or more of criteria 1 . . . n 236 by selecting one or more options of sort selector 1 . . . n 232, where criteria 1 may correspond to sort selector 1, criteria 2 to sort selector 2, and so on. In a non-limiting example, a customer uses the search functionality to generate a list of nearby hotels and selects a particular hotel, for example, hotel A1 122. Hotel A1 122 may be located where the customer is standing. For example, when the customer is standing in the lobby of hotel A1 122, hotel A1 122 may appear at the top of the information rich listing because server 102 correctly identified the location of hotel A1 122 as the closest in proximity to the geolocation of a customer's mobile device. The customer may select location A1 122 or a different business location.

FIG. 2B illustrates an example branded interface 250 for providing a customizable brand display to a customer's mobile device A1 . . . n 160. In an example embodiment, the display of branded interface 250 reflects the specifications provided by authorized users of user console 164. Such specifications may include logos, media, displays of text and/or images, and/or the look and feel of branded interface 200. Branded interface 250 includes a branding canvas 252. Branding canvas 252 may be configured to display information and media according to specifications provided by authorized users of user console 164, for example, executive level franchise A and hotel A1 . . . An users 120*a*, franchise B and restaurant B1 . . . Bn users 130*b*, and/or business C1 . . . Cn users 140*a*. Franchise A may, for example, have a consistent branding scheme for hotel A1 122, hotel A2 124, and hotel An 126. In turn, hotel A1 122 may have a sub-branding and/or a marketing scheme based on local attributes (e.g., resort, business). Branding schemes are specified, defined, designed, and/or modified using user console 164, which provides users with one or more interfaces for providing inputs related to branding (e.g., logos, graphics, media, text, campaigns).

In an example embodiment, the appearance of branded interface 250 is specific to the particular business and/or business location selected by the customer when interacting with select location interface 200. Branded interface 250 may include custom components such as, for example, a business An display 245. Business An display 245 may display a banner comprising a logo with custom information such as reference to the location of the business. Business An display 245 may be customized in user console 164.

In an example embodiment branded interface 250 includes menu options such as a browse option 256, a request option 258, a local option 260, and other options represented by menus n 262. In an example embodiment, default menu options may be automatically displayed on branded interface 250. Custom menu options may be configured for display by adjusting settings and/or by providing input to user console 164. Custom menu options may be useful for promoting a specific and/or time-limited offer. For example, a custom menu option featuring promotional materials may be displayed as menu n 262.

In an example embodiment, upon selection of a menu option on branded interface 250, a customer may be directed to further interfaces populated with specific options and offers. Information displayed may include listings of goods and/or services offered by the selected location, which may be particular to a business location, or may be offered by a franchise, brand, and/or local association which is part of a recommendation network.

FIG. 2C illustrates a request interface 270 operable for receiving a request from a customer's mobile device A1 . . . n 160. In an example embodiment, request interface 270 includes a request pane 272. Request pane 272 is displayed when a corresponding menu option such as, for example, request 258, is selected. Request pane 272 includes a listing component which displays one or more categories as business An request types 1 . . . n 274. Business An request types 1 . . . n 274 displays categories of services such as, for example, reservations and booking, room service, maid service, concierge, and/or other goods and services. Upon selection of a business An request types 1 . . . n 274 category, sub-categories may be displayed as business An request sub-types 1 . . . n 276. A hierarchy of categories and sub-categories may be provided depending on specifications provided in user console 164. Categories and sub-categories may be configured by franchise A and hotel A1 . . . An users 120*a*, franchise B and restaurant B1 . . . Bn users 130*b*, and/or business C1 . . . Cn users 140*a*, for example, to reflect the types of goods and/or services offered based on available staff. In an example embodiment, a general category may be selected for broad or general requests which, for example, may not be amenable to categorical description (e.g., help).

In an example embodiment, request interface 270 includes a message input 282. Message input 282 is configured to receive messages input by a customer, for example, to indicate in natural language a request and/or to elaborate on requests specified using the selection of business An request type 1 . . . n 274 and business An request sub-types 1 . . . n 276. In an example embodiment, a message may be input without selecting a business An request type 1 . . . n 274 and a business An request sub-types 1 . . . n 276. By way of a non-limiting example, a customer may type into message input 282 a message such as "need help cleaning up a mess," which may be generically categorized as "Assistance" or more specifically as "Rooms & Suites" (Category) and "Cleaning Services" (Sub-Category).

In an example embodiment, request interface 270 includes a need by input 286, an options 1 . . . n pane 288, and a submit button 290. Need by input 286 receives input from a customer indicating the date and time by which a request is requested. Need by input 286 may provide a user interface component for selecting a time from a look-up table or list of calculated estimated times for arrival based on, for example, the category selected by the customer. In an example embodiment, time intervals and/or plain language indications are listed (e.g., within one day, within the hour, by the end of the week, immediately, as soon as possible) allowing a customer to indicate whether or not a request is urgent.

In an example embodiment, options 1 . . . n pane 288 may be auto-populated with options corresponding to the selected category and sub-category and/or default-populated with general inquiries related to specification of the request. Options displayed in options 1 . . . n pane 288 or associated with one or more categories may be configured by franchise A and hotel A1 . . . An users 120*a*, franchise B and restaurant B1 . . . Bn users 130*b*, and/or business C1 . . . Cn users 140*a*, for example, to reflect options based on the availability of staff, seasonal availability, time of day, and/or other restrictions or add-ons which may arise. A customer may select one or more options displayed on options 1 . . . n pane 288 in the process of providing inputs to request interface 270.

In an example embodiment, a request input by a customer from a customer mobile device A1 . . . n 160 may be transmitted as a request to server 102 when a submission of the request is executed by the customer. Submission of the request is effectuated by executing the request using submit button 290. Upon submission, a data structure corresponding to customer input into request interface 270 is transmitted to server 102 for processing.

In an example embodiment, customer mobile device A1 . . . n 160 is connected to a wireless local area network and/or telecommunications network operable to initiate and conduct phone calls. Request interface 270 includes a business An call button 284, which may be configured to dial a phone number corresponding to the selected category and/or a general help/concierge service. In an example embodiment, a directory is configured by franchise A and hotel A1 . . . An users 120*a*, franchise B and restaurant B1 . . . Bn users 130*b*, and/or business C1 . . . Cn users 140*a* on user console 164. The directly is mapped to one or more of the categories associated with request inputs. For example, a customer selecting the "Room Service" category may be connected directly to a concierge at that particular business location by executing a call using business An call button 284.

(C) SYSTEM FOR PROVIDING RECOMMENDATIONS

FIGS. 5A-5B, 7A-5B, 10A-10B, and 11F show an example console for managing and providing recommendations. In an example embodiment, user console 164 includes some or all of the features shown in FIGS. 5A-5B, 7A-5B, 10A-10B, and 11F.

In an example embodiment, a recommendation network comprises a collection of relationships between businesses C1 . . . Cn 140, franchise B 130, restaurants B1 . . . Bn 132, franchise A 120, hotel A1 122, hotel A2 124, and/or hotel An 126.

A recommendation network may be managed by interacting with user console 164. In an example embodiment, user console 164 allows a user to configure one or more settings which may be pushed to one or more customer devices, such as customer mobile devices A1 . . . An 160 and associated concierge agent 161. Managing a recommendation network allows a user to control which recommendations and/or recommended businesses are visible to hospitality customers. User console 164 enables a user to configure specific promotions and/or offers based on, for example, location, behavior, and/or promotional agreements. User console 164 enables a user to select settings and/or input data associated with a recommended business on a recommendation network. User console 164 may have limited accessibility to users of recommendation management system 150 depending on their role. Access may be regulated by various security mechanisms known to a person of skill in the relevant arts and as described throughout herein.

In an example embodiment, business manager 108 is connected to user manager 104 and receives data handled by user manager 104 such as various associations between businesses on a recommendation network. Business manager 108 stores mappings of such associations in business database 118. Business database 118 may serve as the active record for user console 164. The active record of business database 118 may be displayed for interaction on user console 164, which may include one or more of the features shown in FIGS. 5A-5B, 7A-5B, 10A-10B, and 11F. User console 164 may be used to view and manage a recommendation network and configure settings applicable to customer mobile devices A1 . . . An 160 and associated concierge agent 161.

In an example embodiment, user console 164 enables a user to view, manipulate, navigate, and/or manage one or more recommendation networks comprised of businesses C1 . . . Cn 140, franchise B 130, restaurants B1 . . . Bn 132, franchise A 120, hotel A1 122, hotel A2 124, and/or hotel An 126. User console 164 enables a user to configure settings associated with a recommendation network and/or to add recommended businesses.

Figure 5A:
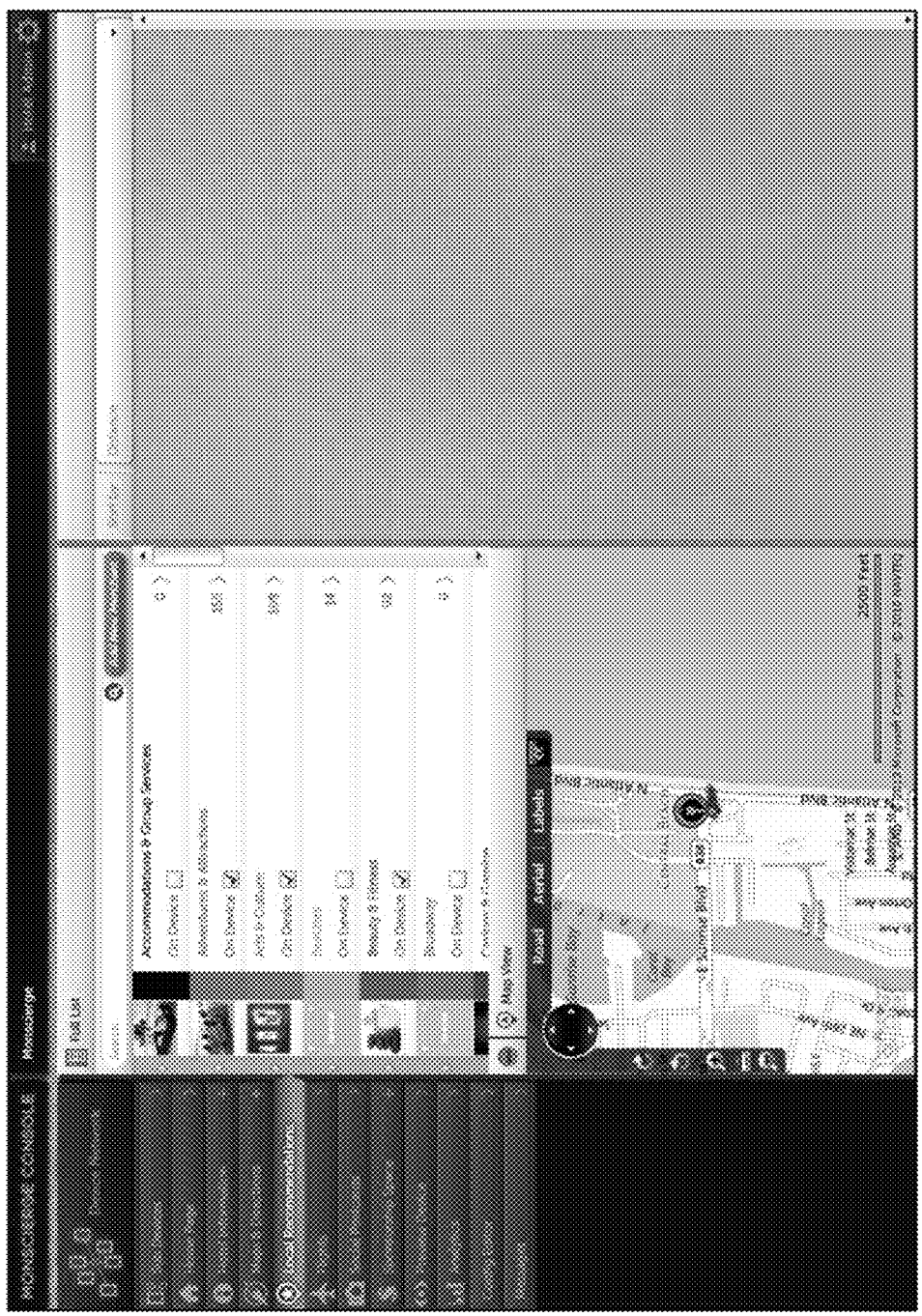

FIG. 5A shows a console for providing recommendations to hospitality customers. In an example embodiment, user console 164 includes one or more panes configured to display one or more lists and information associated with one or more recommended businesses. For example, as shown in FIG. 5A, user console 164 may include one or more panes for displaying tabs or buttons for navigating functions such as, for example, device management, business information management, maps, local recommendations, flights, social networks, sponsorship, previewing, analytics, messages, and/or code editing.

In an example embodiment, a pane may include a list of categories and/or sub-categories, such as, for example, dining, entertainment, recreation, and/or other categories and sub-categories of recommended goods or services offered by a one or more business locations in a recommendation network. Such a list may be dynamic such that the items are linked to an active record associated with recommendation management system 150.

In an example embodiment, a pane may include one or more map views. A map view may provide various user interface elements to facilitate navigation of an interactive geographic map such as, for example, a zooming and/or panning user interface configured to enable a user to navigate a mapped area or region of interest. Such a map display may also display an overlay of the geographic location of one or more businesses or landmarks of interest. Such an overlay may be based on a set of data active in other panes of user console 164. For example, an overlay of geographic location information associated with a map may be based on a query, selection behavior, or any combination thereof made by a user when interacting with user console 164. A navigation pane may include various user interface elements useful for facilitating interaction with user console 164. For example, a global navigation menu may be displayed in user console 164, as shown in FIG. 5A, and may include a login menu, scroll bars, and/or other user interface elements. One having skill in the relevant art(s) would appreciate that other configurations are possible and are not limited to those shown in FIGS. 5A-5B, 7A-5B, 10A-10B, and 11F.

In an example embodiment, as shown in FIG. 5A, a user may select or click one or more buttons associated with a local recommendations function and cause user console 164 to generate a request to recommendation management system 150 to display a set of data associated with a recommendation network in accordance with the user's selection and/or input. As shown in FIG. 5A, user console 164 may include a search bar allowing a user to type in a general search term which once submitted and/or executed generates a request to recommendation management system 150 to retrieve matching criteria and to display the results on one or more panes of user console 164.

Figure 5B:
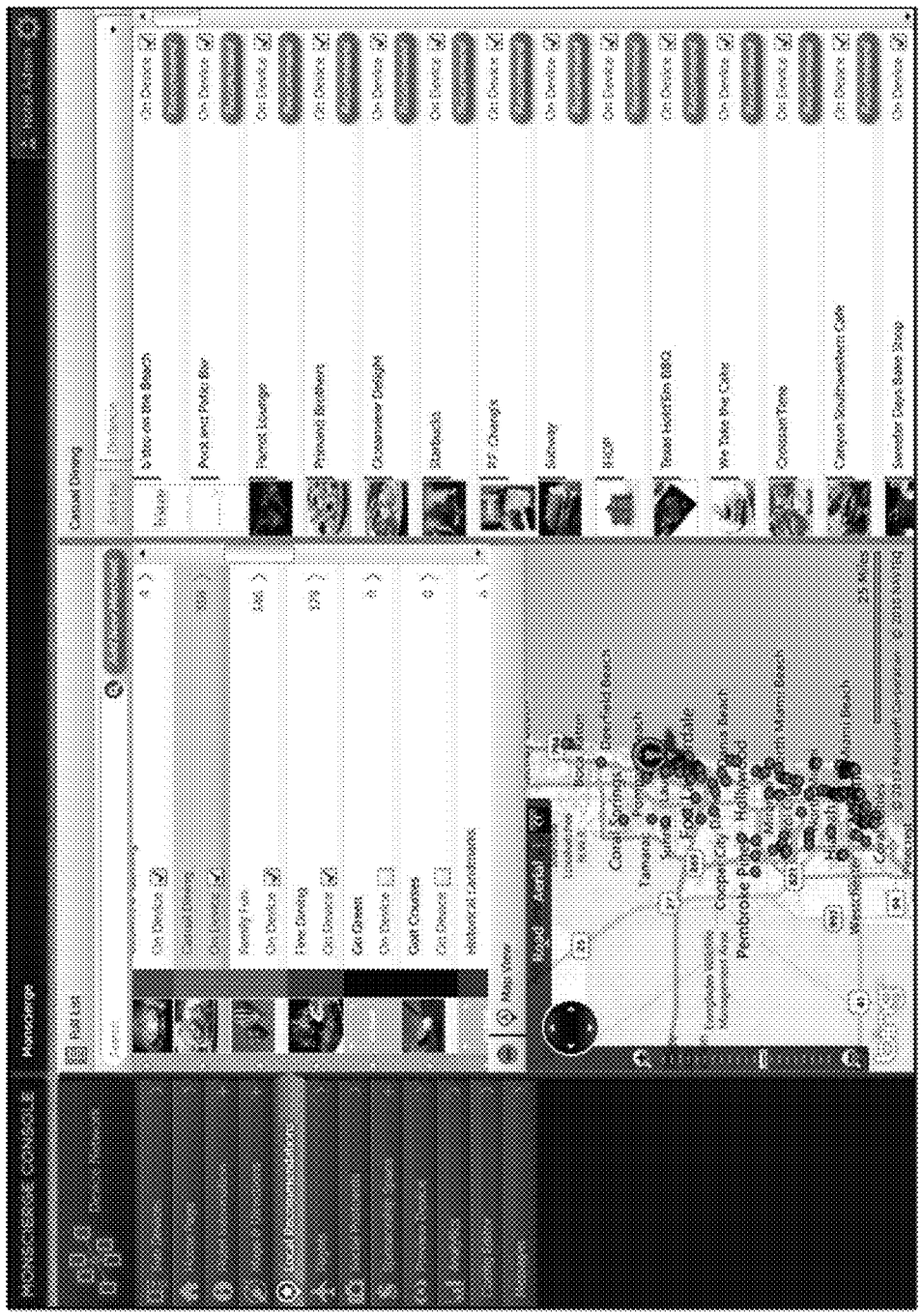

In an example embodiment, FIG. 5B shows user console 164 displaying a listing of one or more particular businesses associated with a given category and/or sub-category of goods or services. As shown in FIG. 5B, a user may click or select a category or a sub-category which causes a request to be generated to recommendation management system 150 to retrieve and respond with results which match the criteria. As shown in FIG. 5B, a listing of matching businesses are displayed along with an indication of whether or not a particular business is recommended and/or configured to be visible on a customer device, such as for example, customer mobile devices A1 . . . n 160 via concierge agent 161. In an example embodiment, such a list may be sorted or filtered as shown in FIG. 5B.

Figure 7A:
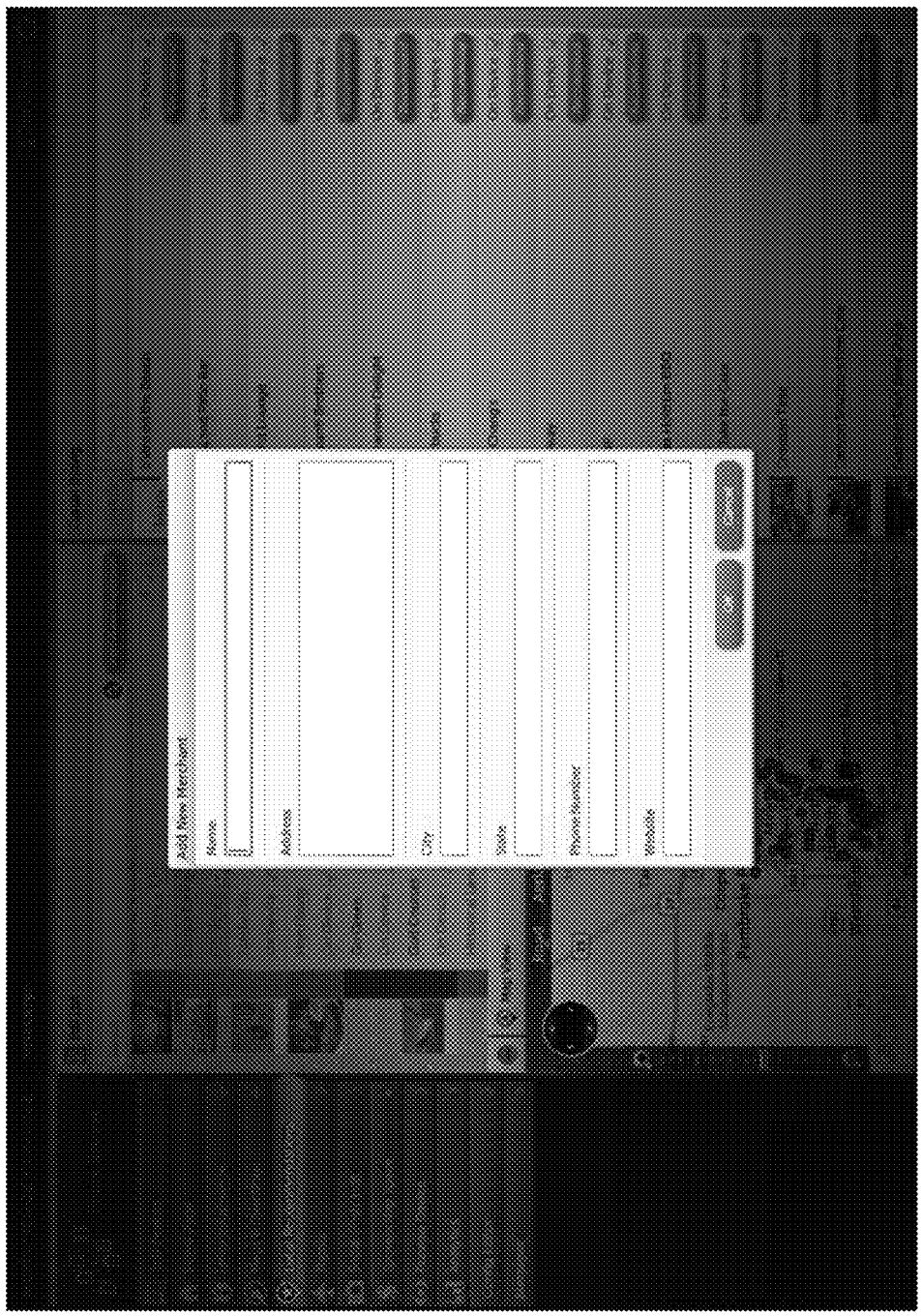
Figure 7B:
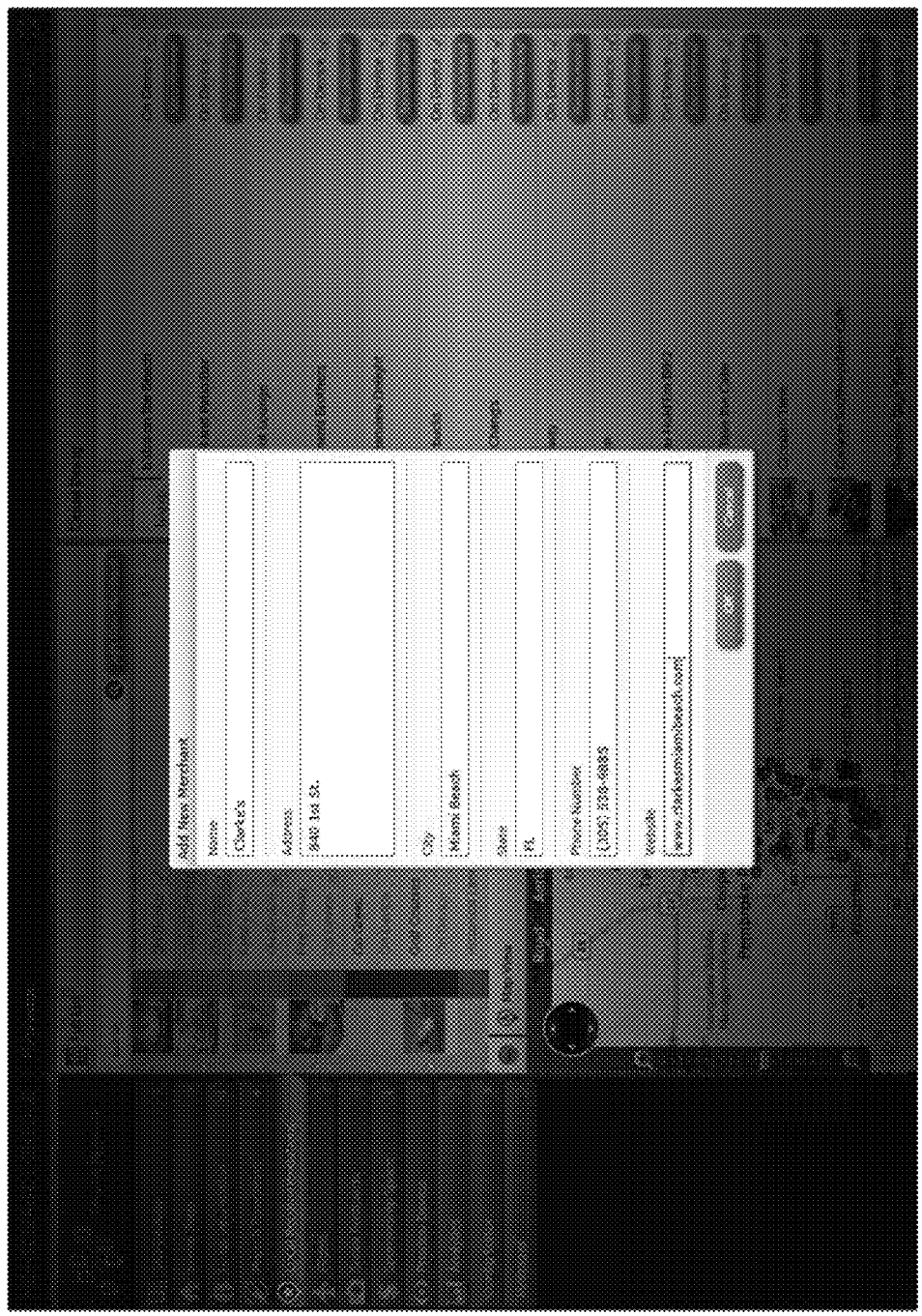

In an example embodiment, FIGS. 7A-7B show a form which is displayed within user console 164 which enables a user to enter or input data associated with a business. A user may enter a name, street address, city, state, phone number, website, or information of like nature which may be associated with a business. Such data may be submitted by the user by selecting an OK button or other user interface element, as shown, for example, in FIG. 7B. Such form data may be sent or transmitted to request management system 150 using, for example, a Hypertext Transport Protocol (HTTP) POST or other protocol. One of skill in the relevant art(s) would understand that other transaction methods are possible and HTTP is used for purposes of illustration not of limitation.

Figure 10A:
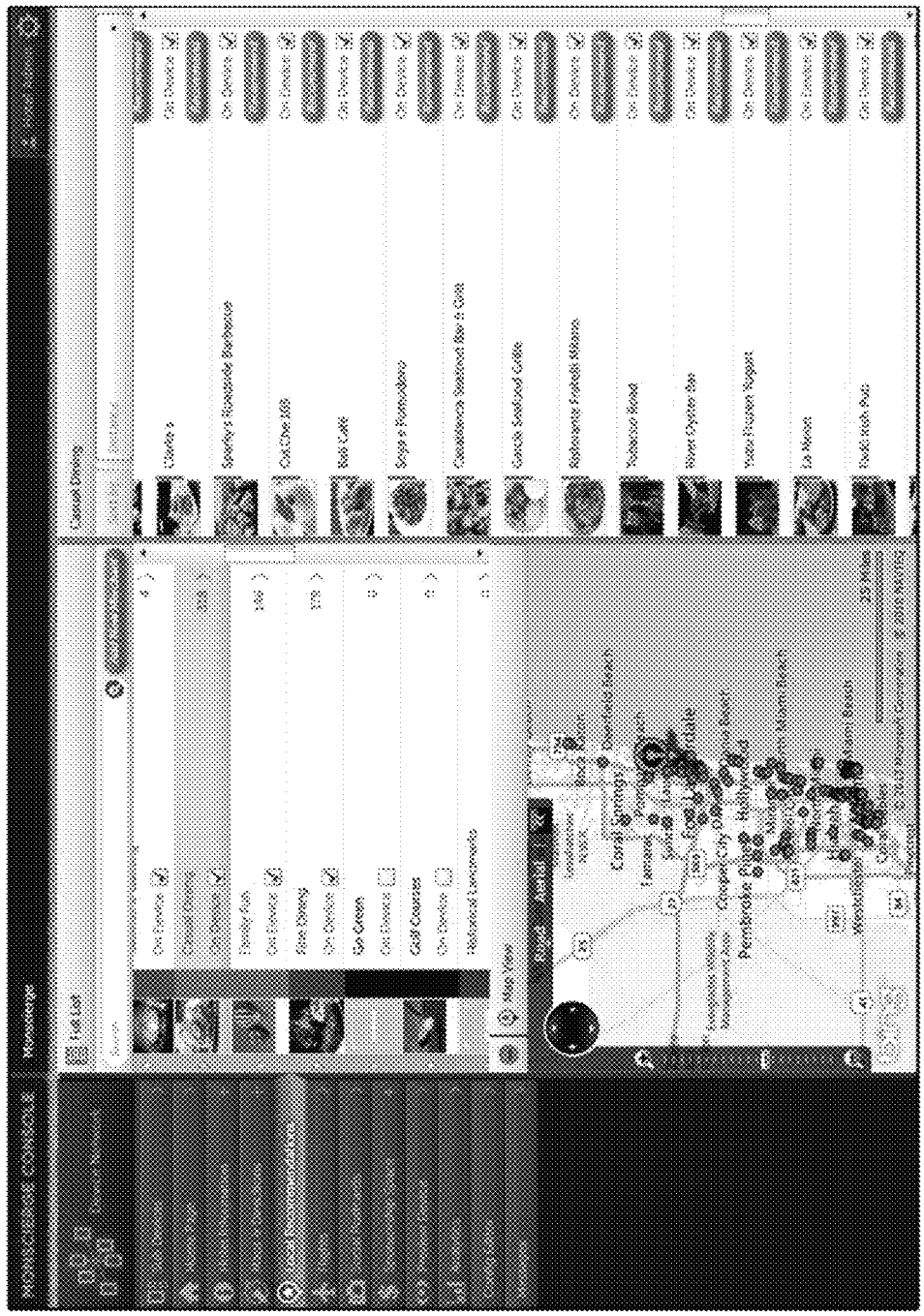
Figure 10B:
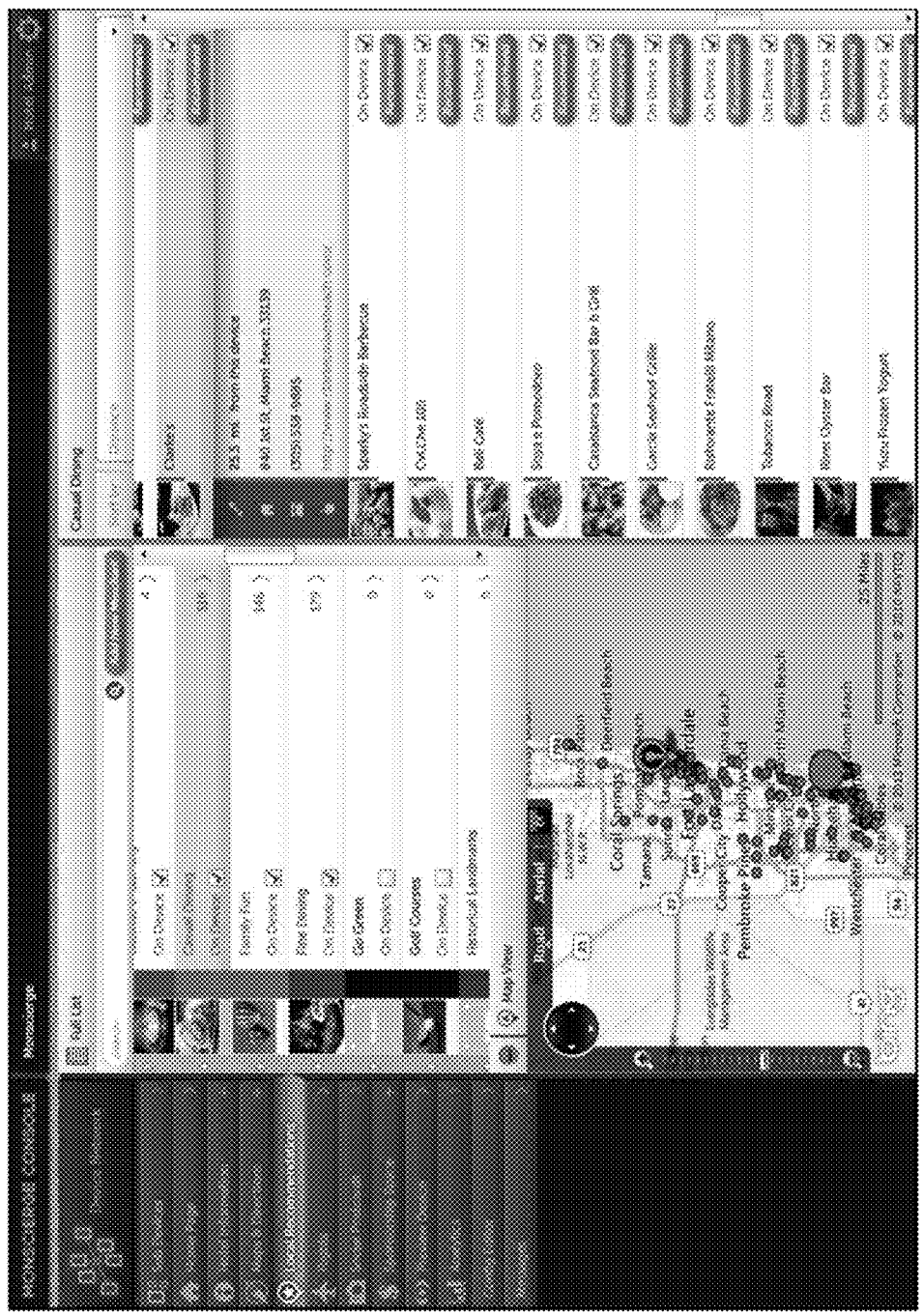

In an example embodiment, FIGS. 10A-10B show the display of a business added to a recommendation network. As shown in FIG. 10B, details entered and/or otherwise associated with the added business may be displayed in one or more panes alongside other recommended businesses. The addition of a business to a recommendation network may involve use of an specialized interface for populating other data input by users such as, for example, a research team as described herein and shown in FIGS. 8A-B.

Figure 11B:
Figure 11A:
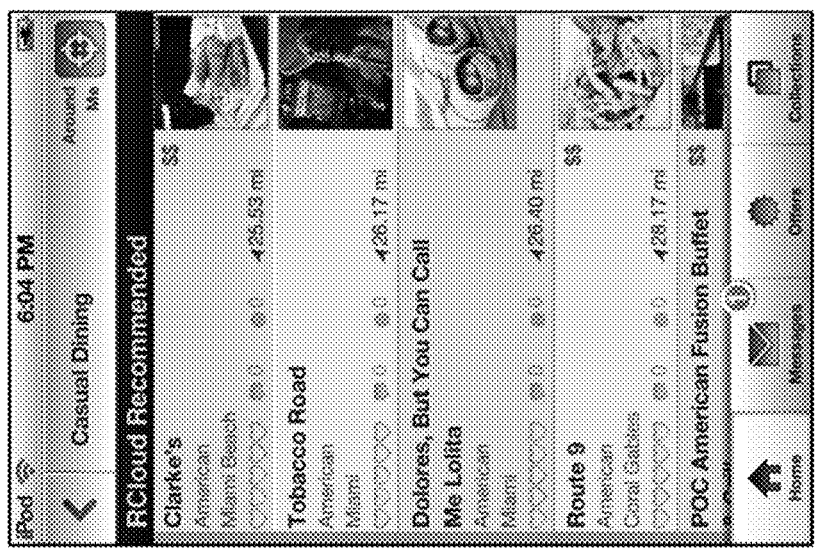
Figure 11C:
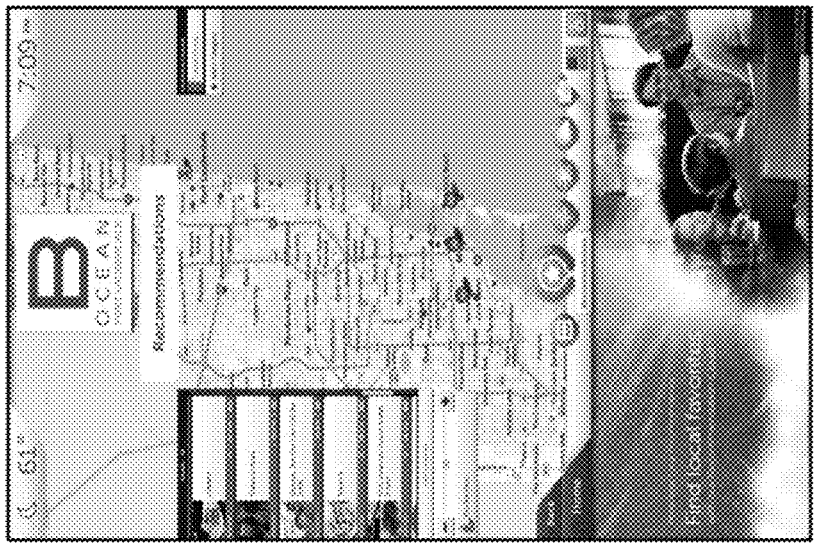
Figure 11D:
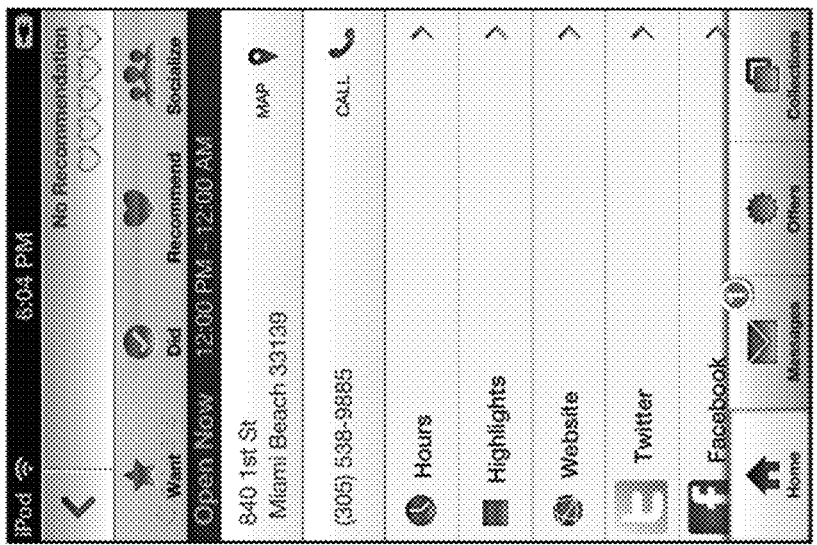
Figure 11E:
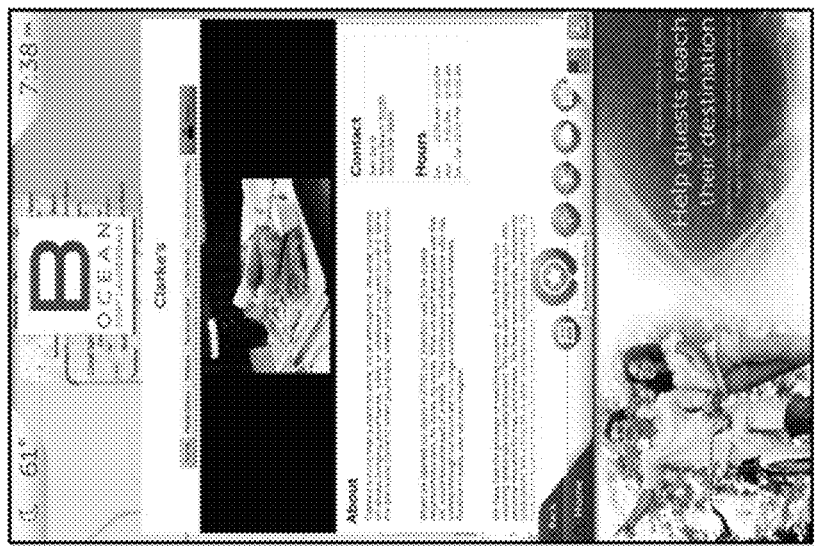
Figure 11F:
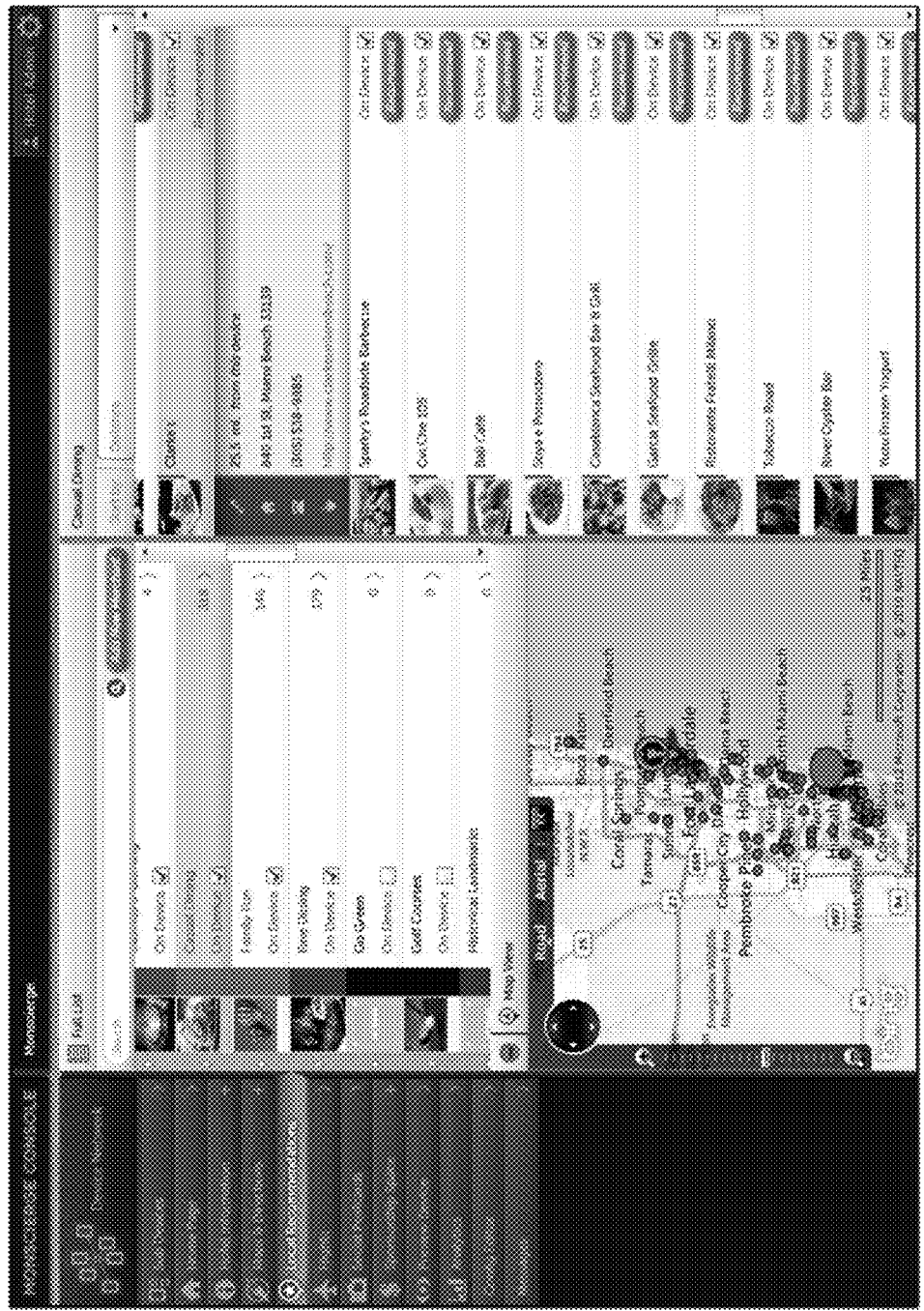

In an example embodiment in FIG. 11F, a user may choose to designate a specific business or type of business as user recommended. For example, where a user is a hotel business, the hotel may designate one or more businesses as hotel recommended. Such a designation may cause the hotel recommended business to appear at the top of a listing, such as a listing visible on customer mobile devices 160 via concierge agent 161.

FIGS. 6A-6D, 11A-C, and 11G show an example customer device application for displaying recommendations to a customer. In an example embodiment, concierge agent 161 includes some or all of the features shown in FIGS. 6A-6D, 11A-C, and 11G.

Figure 6B:
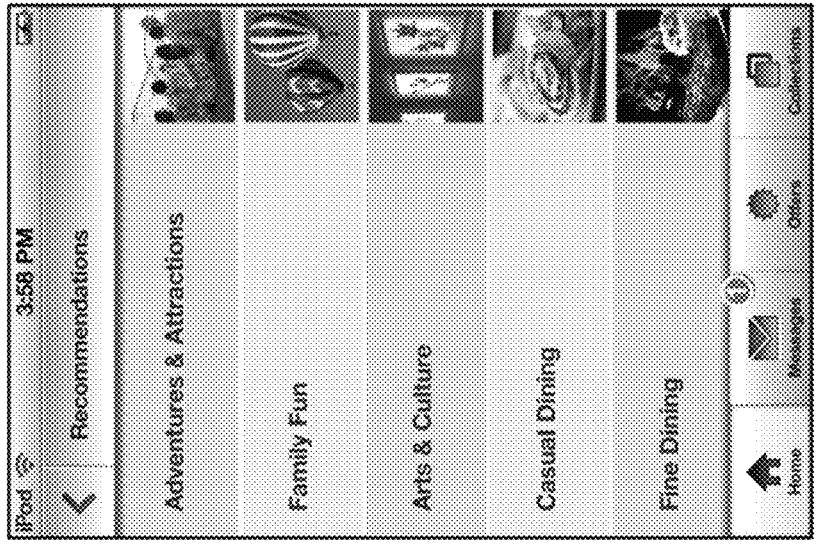
Figure 6A:
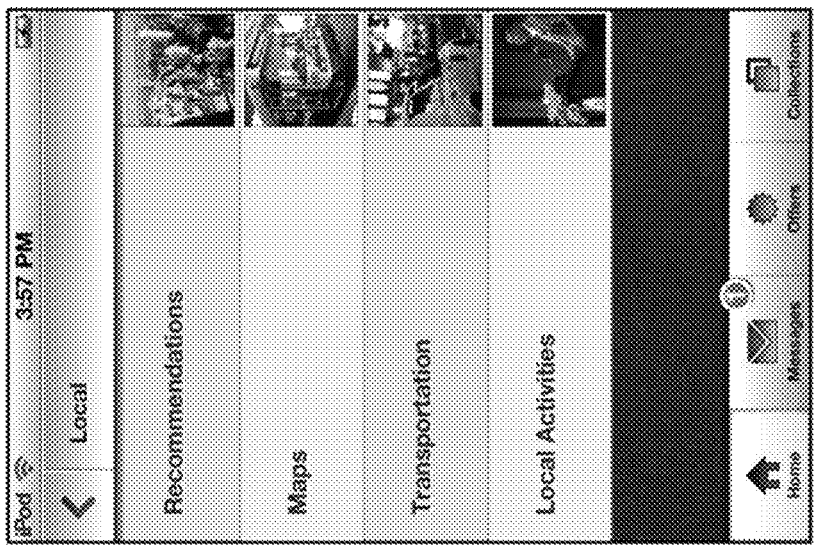
Figure 6D:
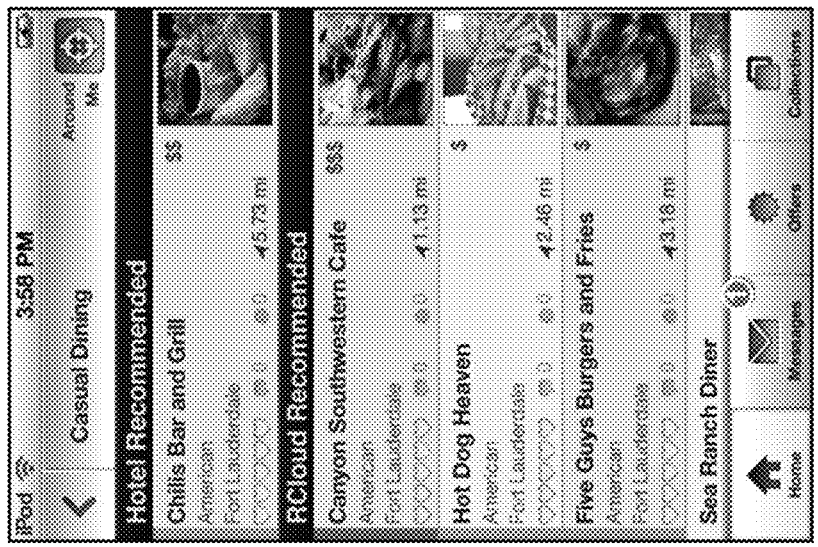
Figure 6C:
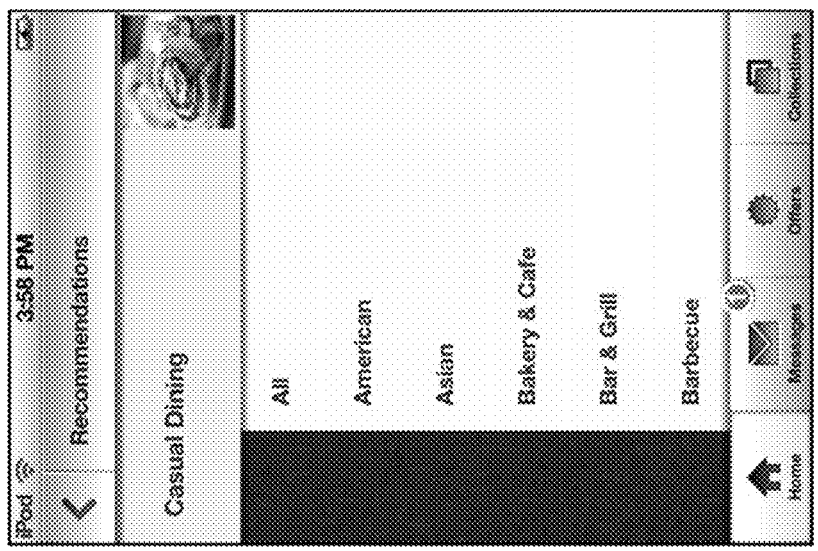

In an example embodiment, FIG. 6A shows a screen displayed to a customer on a user interface associated with concierge agent 161. A customer viewing the display may select an option which generates a request to display recommendations. As shown in FIG. 6B, upon selection of the option to view recommendations, a listing of categories and/ or sub-categories may be displayed within conscierge agent 161. As shown in FIG. 6C, such a listing may be dynamic such that the customer is enabled to browse and/or navigate the listing of categories and sub-categories. As shown in FIG. 6D, within a given category or sub-category, multiple recommended businesses may be populated within the display of conscierge agent 161. Such records may be provided in response to a request initiated by a customer's selection of the target category or sub-category, automatically, and/or may be pre-populated within conscierge agent 161 based on a synchronization routine.

In an example embodiment, FIGS. 11A-11C show an added business as becoming visible to the customer within the display of conscierge agent 161. As shown in FIG. 11B, the added business may be selected by the customer which causes consciege agent 161 to request the relevant data from recommendation management system 150. Details about a particular business may be preloaded or cached in consciege agent 161, for example, as a customer selects a category or sub-category. As shown in FIG. 11C, a detailed view may be displayed in consciege agent 161 which includes address or geographic infolination, hours of operation, contact information such as a telephone number, website, and/or other types of associated data such as, for example, a social network association. As shown in FIG. 11C, consciege agent 161 provides a series of features to the customer to enable the customer to provide feedback. Such features include, but are not limited to, one or more options for indicating whether the recommended business is wanted, done or enjoyed by the customer, recommended, and/or a target for social network activity by the customer.

Figure 11G:

In an example embodiment, FIG. 11G shows, that a recommended business is featured on the display provided by conscierge agent 161 when the business is specifically designated as a user recommended business. For example, where a user is a hotel, the hotel may designate one or more businesses as hotel recommended. A designation may cause the recommended business to appear at the top, near the top, or otherwise cause the business to be featured prominently on the display provided by consciege agent 161.

FIGS. 6E-6F, 11D-11E, and 12A-12B show an example public display application for displaying recommendations to customer. In an example embodiment, public displays include some or all of the features shown in FIGS. 6E-6F, 11D-11E, and 12A-12B.

Figure 6F:
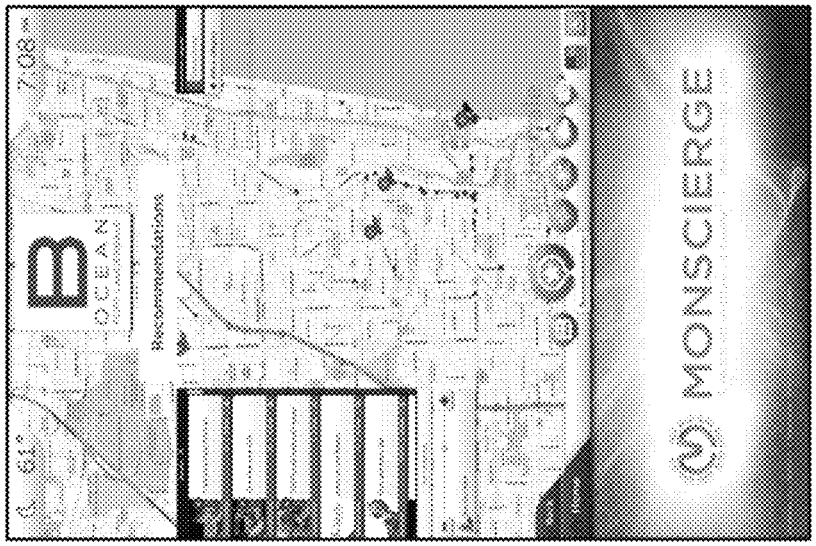
Figure 6E:
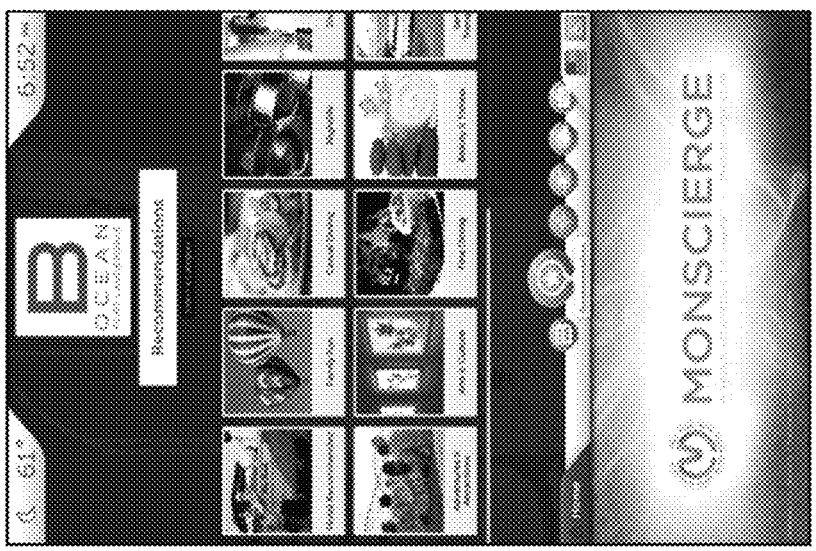

In an example embodiment, FIGS. 6E-6F show a public display interface. Guests in a hotel, for example, may interact with a public display interface such as, for example, a kiosk, interactive display device, or any screen configured to receive inputs and display images and/or information. As shown in FIG. 6E, a public display interface situated, for example, in the lobby of a hotel may display one or more categories or sub-categories of businesses recommended by the hotel. As shown in FIG. 6F, a guest may interact with the public display interface by selecting user interface elements displayed on a screen which generate corresponding requests to recommendation management system 150 to retrieve and post the requested data to one or more target display devices. A guest may navigate categories and sub-categories using various user interface elements displayed. As shown in FIG. 6F, a public display interface may include an interactive map. Such a map display may display an overlay of geographic location information associated with of one or more businesses or landmarks of interest. An overlay may be based on a set of data active the public display application. For example, an overlay of geographic location information associated with a map may be based on a query, selection behavior, or any combination thereof made by a user when interacting with the public display application. A navigation pane may include various user interface elements useful for facilitating interaction with the public display application. For example, a global navigation menu may be displayed in the public display application, as shown in FIGS. 6E-6F, 11D-11E, and 12A-12B, and may include a menu, scroll bars, and/or other user interface elements. One having skill in the relevant art(s) would appreciate that other configurations are possible and are not limited to those shown in FIGS. 6E-6F, 11D-11E, and 12A-12B.

As shown in FIG. 11E, a business may be selected by the guest which causes the public display application to request the relevant data from recommendation management system 150. Details about a particular business may be preloaded or cached, for example, as a hotel guest selects a category or sub-category. As shown in FIG. 11E, a detailed view may be displayed in the public display application which includes address or geographic information, hours of operation, contact information such as a telephone number, website, and/or other types of associated data such as, for example, a social network association.

Figure 12B:
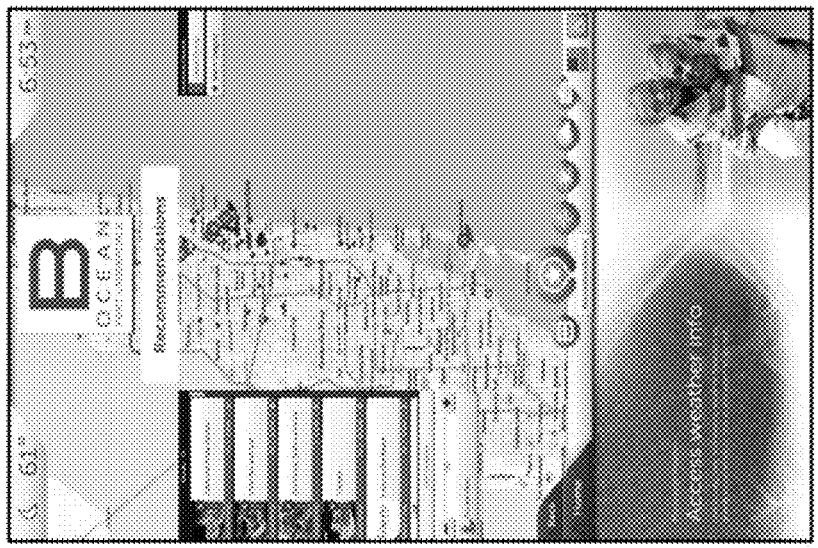
Figure 12A:

In an example embodiment, FIGS. 12A-12B show that businesses designated, for example by a user designating a specific business as user recommended, are featured on a public display. For example, where a user is a hotel business, the hotel may designate one or more businesses as hotel recommended. A designation may cause the recommended business to appear at the top, near the top, or otherwise to be featured prominently in the public display. As shown in FIG. 12B, signifiers may be added to even more prominently feature a hotel recommended business such as, for example, by displaying or imposing a ribbon, insignia, badge, and/or other token of approval in association with the item.

Figure 8A:
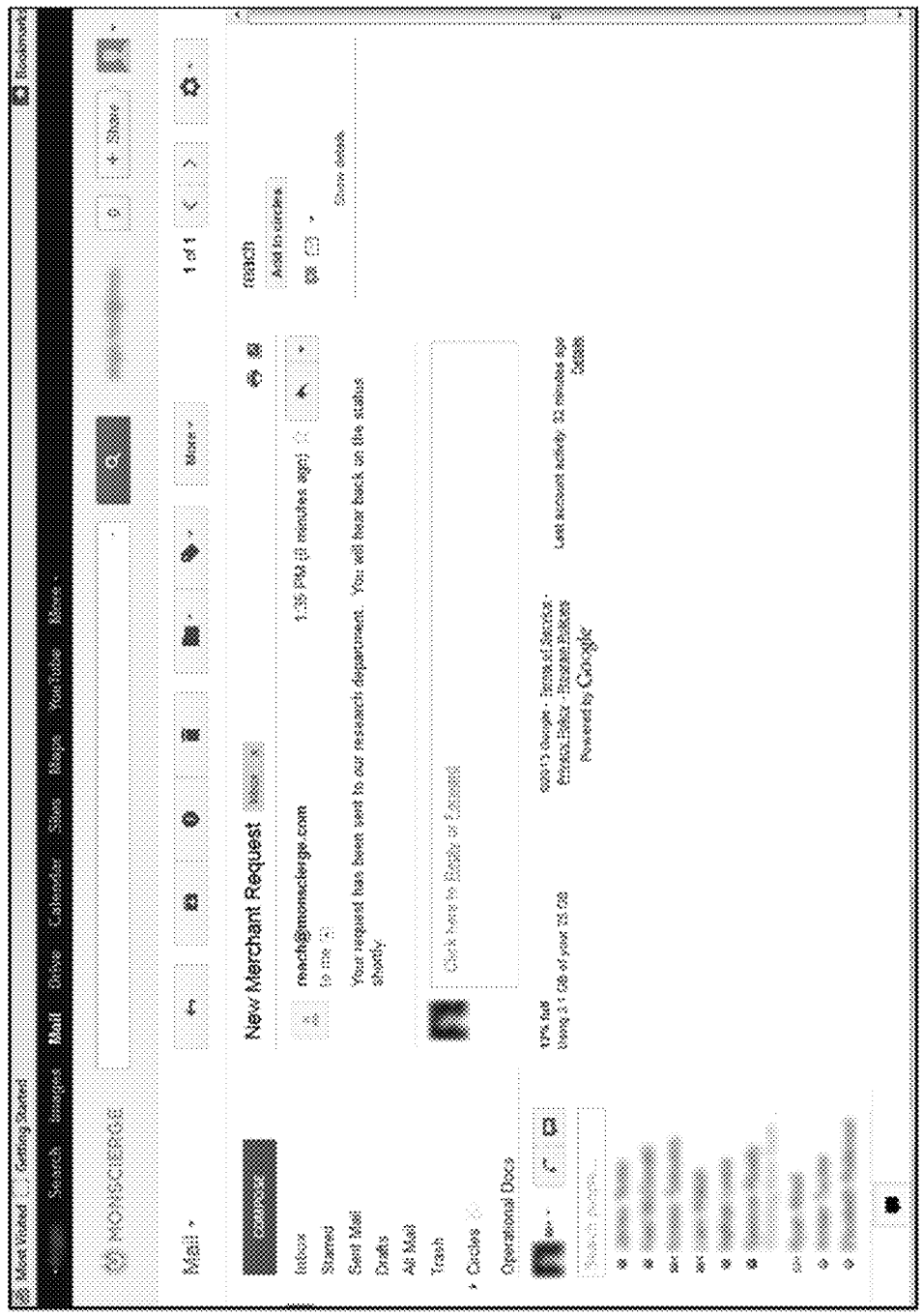
Figure 8B:
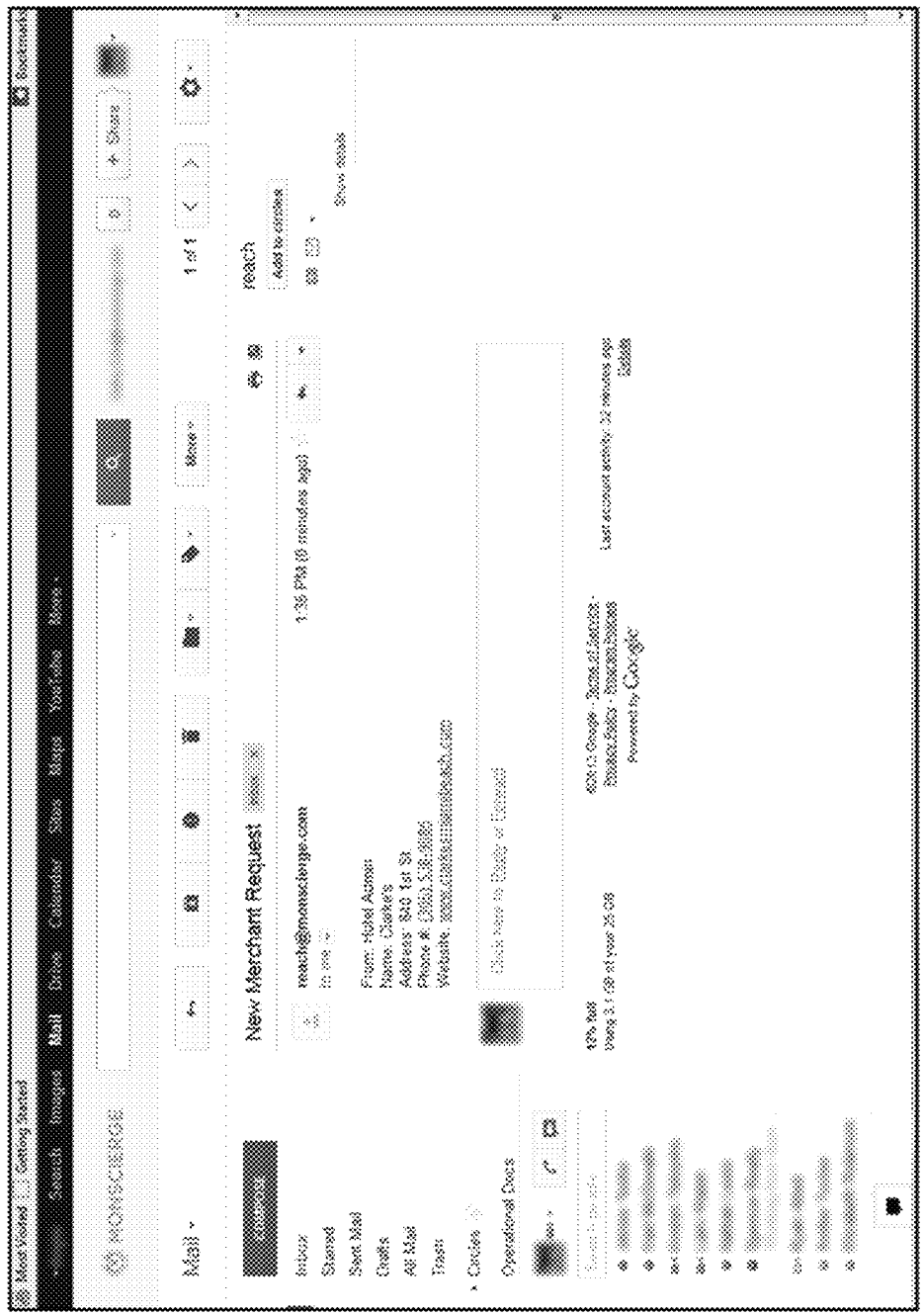

FIGS. 8A-B show an example client for submitting a recommended business for association with a recommendation network managed on recommendation management system 150. In an example embodiment, user console 164 is associated with an electronic mail client which generates a notification to a user indicating that the business sought to be added to a recommendation network has been sent to one or more research users for evaluation prior to being added to the recommendation network. The notification may be transmitted as an electronic message as shown in FIG. 8A. As shown in FIG. 8B, research users may receive an electronic mail notification which includes the data submitted by a user of user console 164 such as, for example, the business a user seeks to add to one or more recommendation networks and associated data. A research user may receive source information based on the login credentials associated with the user of user console 164.

Figure 9A:
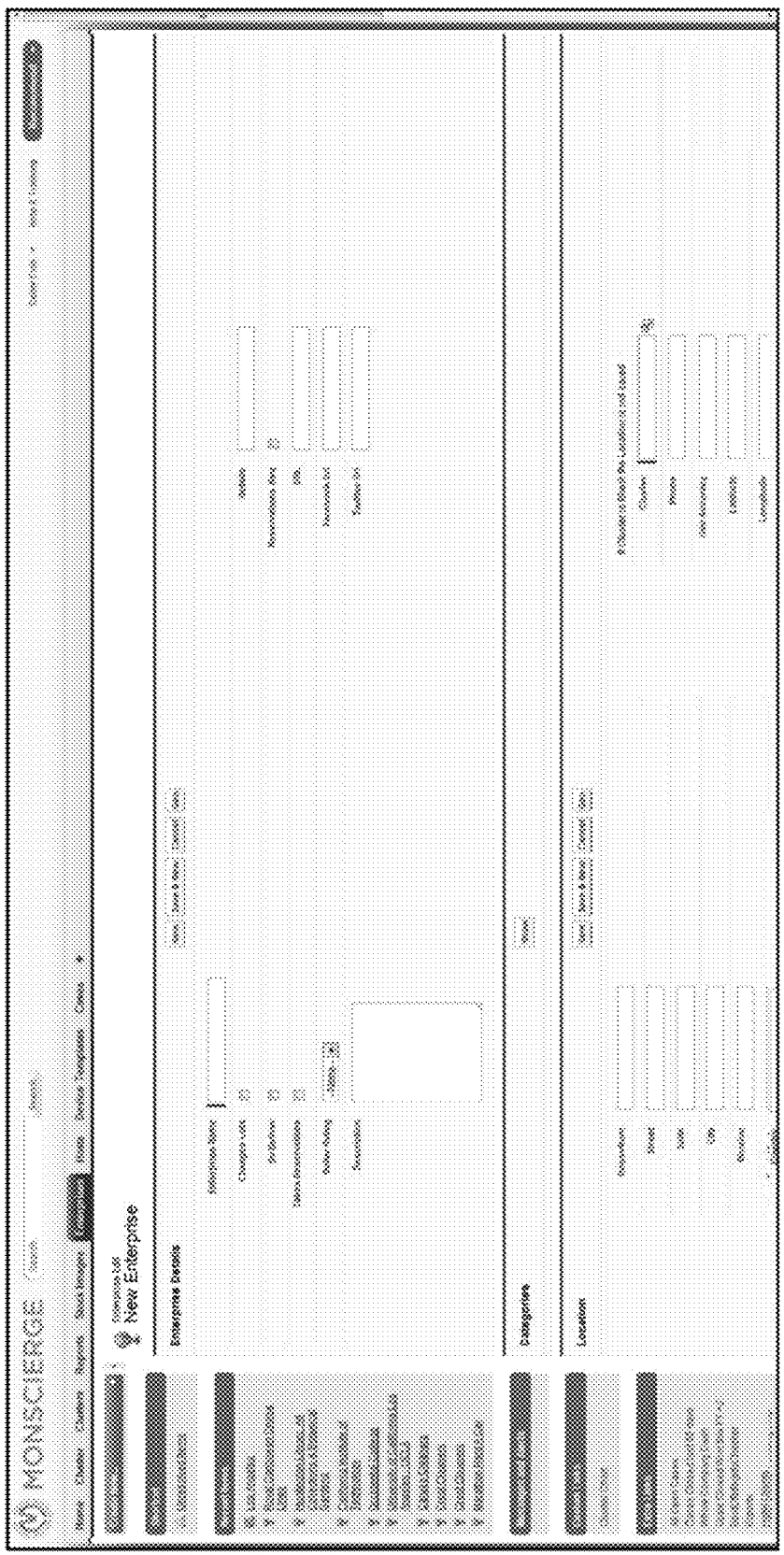
Figure 9C:
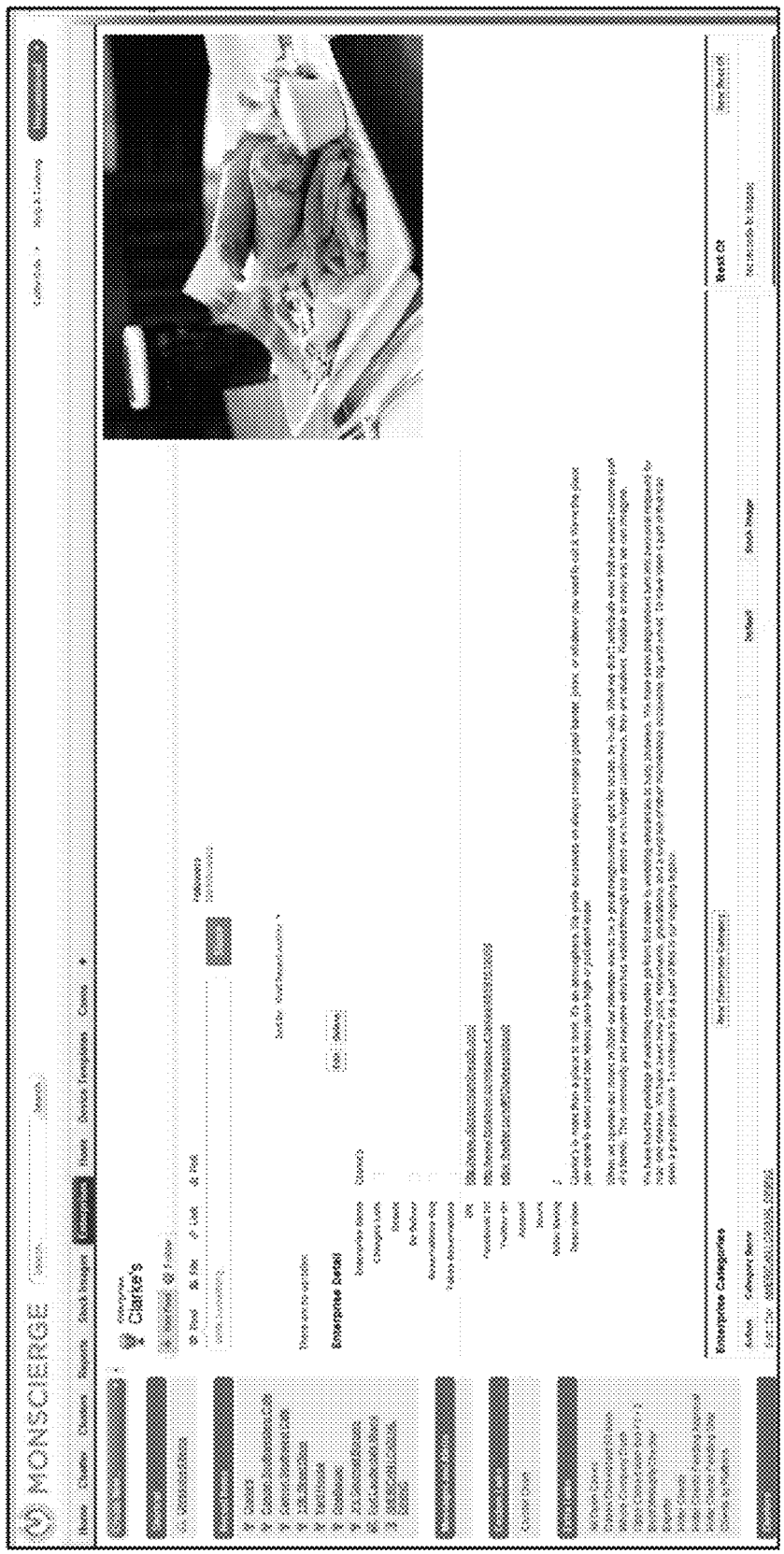

In an example embodiment, FIGS. 9A-9C show an example sales force interface for researching, vetting, configuring, denying and/or adding a business submitted by one or more users of user console 164. As shown in FIG. 9A, a sales force and/or a research user may enter data to create an entry for the business on recommendation management system 150. As shown in FIG. 9B, data may be populated to create a record including but not limited to a name, service offerings, business description, social network associations, geographic location, rating, and/or other forms of content such as an image, multimedia and/or hypermedia. As shown in FIG. 9C, such a record may be rendered active in one or more caches and/or business database 118 by approval and/or submission of the form contents by the sales force and/or research user. Records may be previewed and edited.

One of skill in the relevant art(s) would understand that other implementations or reconfigurations of the various user interfaces shown in FIGS. 5A-5B, 6A-6F, 7A-7B, 8A-8B, 9A-C, 10A-10B, 11A-11G, and 12A-12B are possible.

(D) METHOD FOR PROVIDING RECOMMENDATIONS

Figure 3:
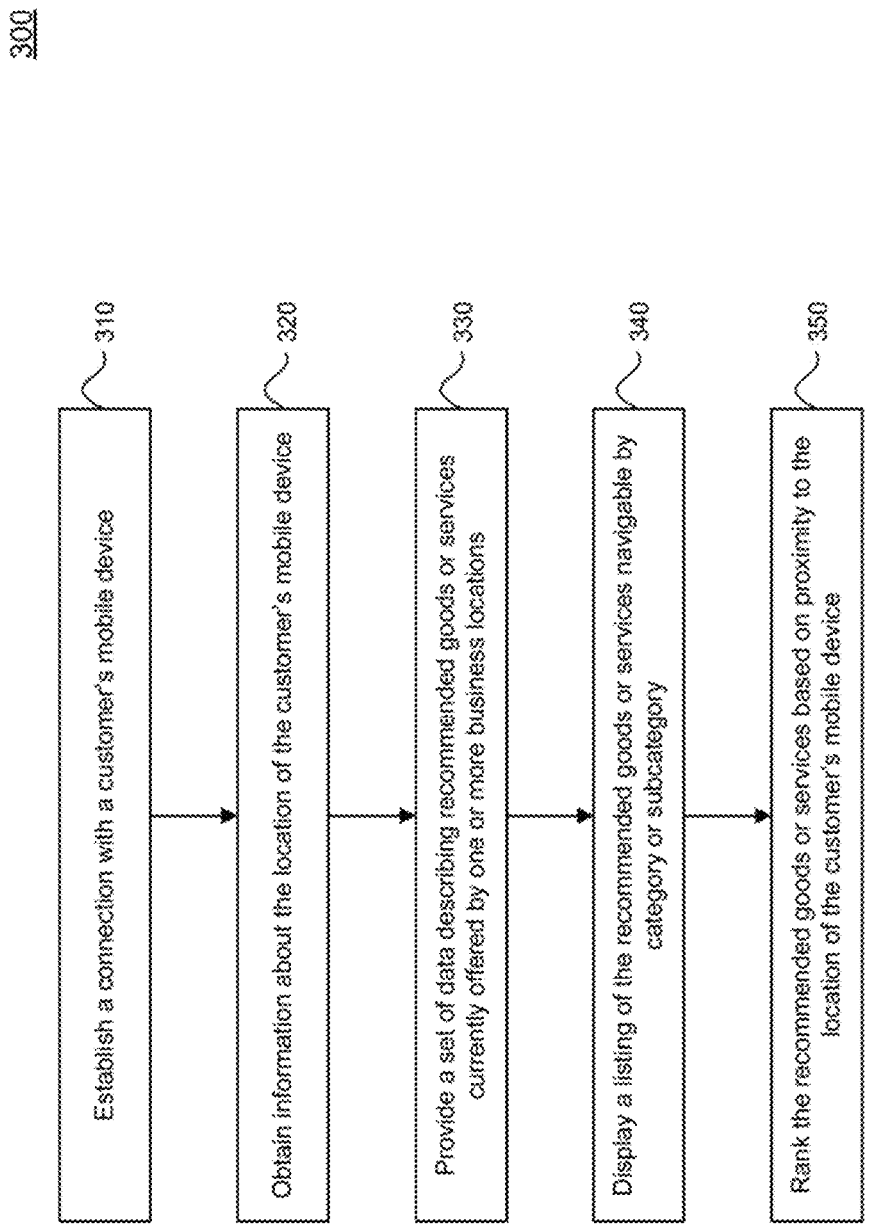
FIG. 3 is a flowchart illustrating a process for providing recommendations.

In an example embodiment, FIG. 3 is a flow chart of a method 300 for providing recommendations to a customer using a recommendation management system.

As shown in FIG. 3, in step 310, a connection is established with a customer's mobile device. In an example embodiment, customer mobile devices A1 . . . n 160 each include a concierge agent 161. Concierge agent 161 is a mobile application that can operate as described herein to communicate with server 102 and provide one or more displays to a customer. These displays display data sent from server 102 and can include interfaces where a user can make selections and input data for sending to server 102. In this way, according to a feature, a variety of concierge and hospitality services can be provided to serve a customer through concierge agent 161.

As shown in FIG. 3, in step 320, information is obtained about the location of the customer's mobile device. In an example embodiment, business manager 108 may include a recommendation engine 110. Recommendation engine 110 may receive data from customer mobile devices A1 . . . n 160 handled, for example, by a customer manager 106. Such data may include, for example, geolocation, natural language, and/or search criteria in the form of query. For example, recommendation engine 110 may receive contextual information from customer manager 106 such as, for example, location, a history associated with customer mobile devices A1 . . . n, information obtained from an account, and/or data accessible to a server connected to a mobile client.

As shown in FIG. 3, in step 330, a set of data describing recommended goods or services currently offered by one or more business locations is provided to the customer's mobile device. In an example embodiment, recommendation engine 110 processes input from customer mobile devices A1 . . . n 160. Input may include a specific request for a recommendation regarding particular goods and/or services. Recommendation engine 110 may also receive data without input from a customer.

In step 340, a listing of the recommended goods or services navigable by category or subcategory is displayed on the customer's mobile device. In an example embodiment, FIG. 5B shows user console 164 displaying a listing of one or more particular businesses associated with a given category and/or sub-category of goods or services. As shown in FIG. 5B, a user may click or select a category or a sub-category which causes a request to be generated to recommendation management system 150 to retrieve and respond with results which match the criteria. As shown in FIG. 5B, a listing of matching businesses are displayed along with an indication of whether or not a particular business is recommended and/or configured to be visible on a customer device, such as for example, customer mobile devices A1 . . . n 160 via concierge agent 161.

In step 350, the recommended goods or services currently offered by one or more business locations are ranked based on proximity to the location of the customer's mobile device. In an example embodiment, recommendation engine 110 generates query syntax reflecting a decision tree of criteria and prioritization based on, for example, proximity of location, relevance to search terms input or deduced from context triggers, partnerships or promotional agreements, such as those reflected by association with the recommendation network, and/or prediction using one or more algorithms such as, for example, a Bayesian algorithm. Business database 118 returns results. Results returned by business database 118 are processed for display by recommendation engine 110 which may apply additional filtering and/or arrange the results so as to provide, for example, information rich listings. Listings may be further filtered, sorted, and/or arranged by customer manager 106 and/or on customer mobile devices A1 . . . n. Data structures output by recommendation engine 110 may be displayed by a native application or web application.

Figure 4:
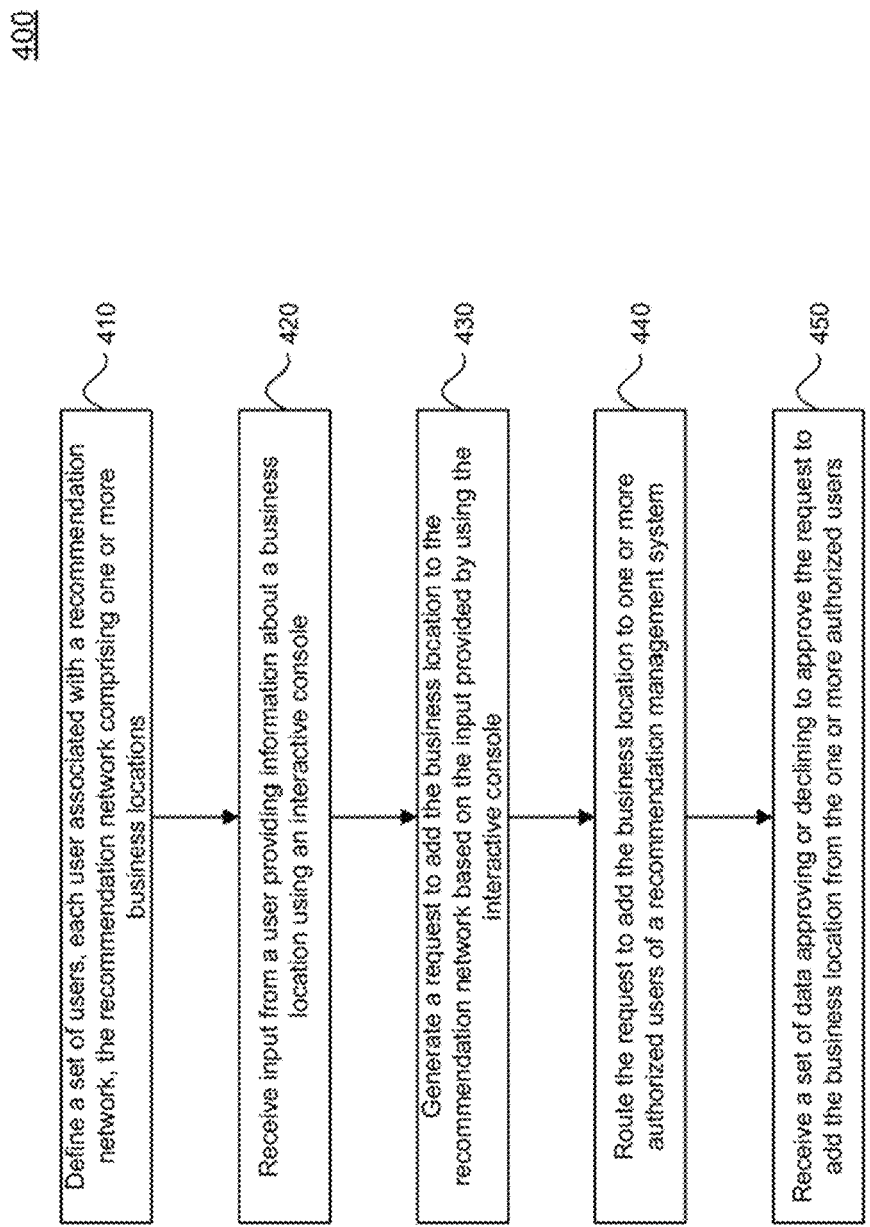
FIG. 4 is a flowchart illustrating a process for adding a recommended business.

In an example embodiment, FIG. 4 is a flow chart of a method 400 for providing recommendations to a customer using a recommendation management system.

In step 410, a set of users is defined, each user associated with a recommendation network, the recommendation network comprising one or more business locations. In an example embodiment, one or more businesses C1 . . . Cn 140 have business relationships with franchise A 120 and/or one or more of hotel A1 122, hotel A2 124, and hotel An 126. Relationships may include agreements to promote goods or services offered by businesses C1 . . . Cn 140 to hotel customers. Such relationships may be established at the level of franchise A 120 and/or at the level of individual hotel A1 122, hotel A2 124, and/or hotel An 126. In an example embodiment, a recommendation network comprises a collection of relationships between businesses C1 . . . Cn 140, franchise B 130, restaurants B1 . . . Bn 132, franchise A 120, hotel A1 122, hotel A2 124, and/or hotel An 126. Such a recommendation network may be used to connect customers with promotions and offers based on, for example, location, behavior, and/or cross-promotional agreements. Server 102 stores and processes information related to one or more of franchise A 120, hotel A1 122, hotel A2 124, hotel An 126, franchise B 130, restaurants B1 . . . Bn 132, and/or businesses C1 . . . Cn 140, collectively referred to as users. Users of server 102 may have partnerships, associations, and/or relationships with each other.

In step 420, input is received from a user providing information about a business location using an interactive console. In an example embodiment, FIGS. 7A-7B show a form which is displayed within user console 164 which enables a user to enter or input data associated with a business. A user may enter a name, street address, city, state, phone number, website, or information of like nature which may be associated with a business. Such data may be submitted by the user by selecting an OK button or other user interface element, as show, for example, in FIG. 7B.

In step 430, a request to add the business to the recommendation network is generated based on the input provided by using the interactive console. In an example embodiment, form data entered by a user is transmitted to request management system 150 using, for example, a Hypertext Transport Protocol (HTTP) POST or other protocol.

In step 440, the request to add the business location to one or more authorized users of a recommendation management system. In an example embodiment, FIGS. 8A-B show an example client for submitting a recommended business for association with a recommendation network managed on recommendation management system 150. As shown in FIG. 8B, research users receive an electronic mail notification which includes the data submitted by a user of user console 164 such as, for example, the business a user seeks to add to one or more recommendation networks and associated data. A research user may receive source information based on the login credentials associated with the user of user console 164. FIGS. 9A-9C show an example sales force interface for researching, vetting, configuring, denying and/or adding a business submitted by one or more users of user console 164. As shown in FIG. 9A, a sales force and/or a research user may enter data to create an entry for the business on recommendation management system 150. As shown in FIG. 9B, data is populated to create a record.

In step 450, a set of data is received approving or declining to approve the request to add the business location from the one or more authorized users. As shown in FIG. 9C, a record may be rendered active in one or more caches and/or business database 118 by approval and/or submission of the form contents by the sales force and/or research user. Records may be previewed and edited.

(E) EXAMPLE COMPUTING DEVICES

Embodiments can be implemented, for example, using one or more computing devices. A computing device can be any type of device having one or more processors. For example, a computing device can be a workstation, mobile device (e.g., a mobile phone, personal digital assistant, tablet or laptop), computer, server, computer cluster, server farm, game console, set-top box, kiosk, embedded system, computer system such as computer system 1300, or other device having at least one processor and memory.

Customer mobile devices 160 and user mobile devices 162 can be implemented for example on a mobile computing device including but not limited to a mobile phone, personal digital assistant, tablet or laptop, game console, set-top box, embedded system or other device having at least one processor and memory. Concierge agent 161 and concierge staff agent 163 can be implemented in software, firmware, hardware, or a combination thereof.

User console 104 and server 102 including recommendation management system 150 (with its components user manager 104, business manager 108, and customer manager 106) likewise can be implemented on one or more computing devices at the same or different locations. Server 102 including recommendation management system 150 (with components user manager 104, business manager 108, and customer manager 106) for example can be implemented on a computer cluster or a server farm on different computing devices over a cloud, and can each have their functionality distributed across different computing devices depending upon a particular implementation.

Similarly, user database 114, customer database 116, and business database 118 can be stored on any type of storage device including, but not limited to, memory. In one example, user database 114, customer database 116, and business database 118 can each be a database in structured memory, such as, a relational database stored in persistent memory on one or more devices at the same or different locations. User database 114, customer database 116, and business database 118 can also be stored over a network at different locations and/or in computing cloud.

Figure 13:
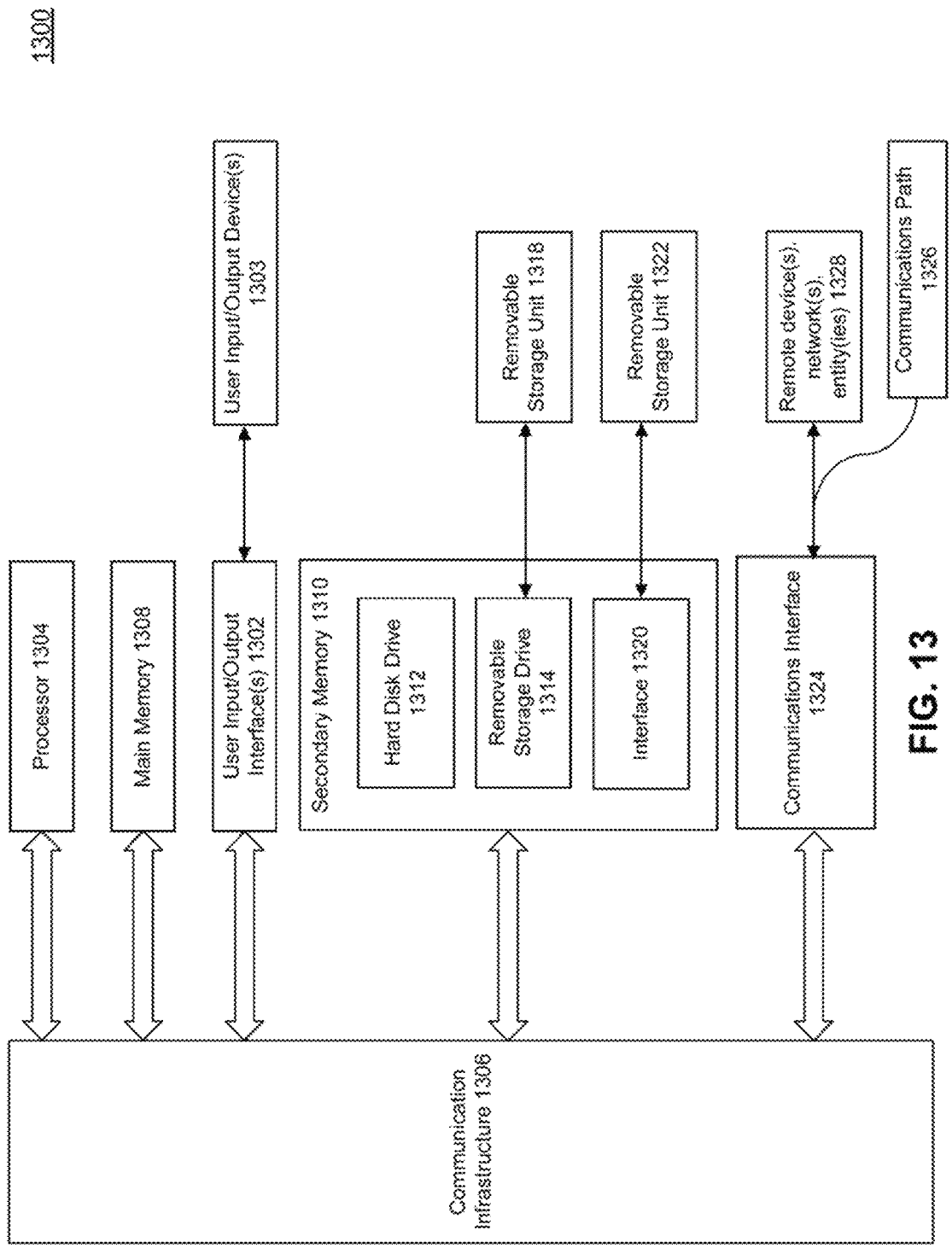
FIG. 13 is an example computer system that is useful for implementing various embodiments.

Various embodiments can be implemented, for example, using one or more well-known computer systems, such as computer system 1300 shown in FIG. 13. Computer system 1300 can be any well-known computer capable of performing the functions described herein, such as computers available from International Business Machines, Apple, Sun, HP, Dell, Sony, Toshiba, etc.

Computer system 1300 includes one or more processors (also called central processing units, or CPUs), such as a processor 1304. Processor 1304 is connected to a communication infrastructure or bus 1306. Computer system 1300 also includes user input/output device(s) 1303, such as monitors, keyboards, pointing devices, etc., which communicate with communication infrastructure 606 through user input/output interface(s) 1302. Computer system 1300 also includes a main or primary memory 1308, such as random access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

In an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 13. In particular, embodiments may operate with software, hardware, and/or operating system implementations other than those described herein.

(F) CONCLUSION

The Title, Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by an of the above-described exemplary embodiments, but should be defined only in accordance with the following claims and their equivalents.

What is claimed is:

1. A computer implemented method for providing recommendations on behalf of a hotel business entity as a concierge service to a hospitality customer having a mobile device using a recommendation management system coupled over a network to the mobile device, comprising:
   storing in the recommendation management system a plurality of recommendations approved by respective hotel business entities, the plurality of recommendations being for goods or services offered by a plurality of businesses and approved by the respective hotel business entities as recommendations for customers of the respective hotel business entities;
   establishing a connection with the customer's mobile device;
   obtaining, via the connection, information about the location of the customer's mobile device;
   determining a hotel business entity associated with the location of the customer's mobile device from the plurality of hotel business entities;
   determining recommended goods or services in the stored recommendations for goods or services offered by a plurality of businesses at one or more different business locations and approved by the determined hotel business entity associated with the location of the customer's mobile device for display to customers of the determined hotel business entity as local recommendations; and
   outputting for display as local recommendations on the customer's mobile device a listing of the recommended goods or services navigable by category or subcategory.

2. The method recited in claim 1, further comprising:
   defining a list of recommendation categories or subcategories, each category or subcategory assigned to one or more goods or services currently offered by the plurality of businesses at the one or more business locations.

3. The method recited in claim 1, further comprising:
   defining a set of users associated with a recommendation network that includes the hotel business entity and associated businesses.

4. The method recited in claim 3, further comprising:
   adding a business to the recommendation network based on input received from a user; and
   associating the added business with one or more categories or subcategories of goods or services.

5. The method recited in claim 4, the adding further comprising:
   receiving input from the user providing information about the business using an interactive console;
   generating a request to add the business to the recommendation network based on the input provided by using the interactive console;
   routing the request to add the business to one or more authorized users of the recommendation management system; and
   receiving a set of data approving or declining to approve the request to add the business from the one or more authorized users.

6. The method recited in claim 3, further comprising:
   determining additional recommended goods or services offered by additional businesses in the recommendation network according to relationships between the determined hotel business entity and the additional businesses; and
   outputting for display as local recommendations on the customer's mobile device an additional listing of the additional recommended goods or services navigable by category or subcategory.

7. The method recited in claim 6, wherein the relationships comprise partnership agreements or promotion agreements.

8. The method recited in claim 1, further comprising:
   ranking the goods or services currently offered by the plurality of businesses based on proximity to the location of the customer's mobile device.

9. The method recited in claim 1, further comprising:
   receiving a selection from the customer's mobile device requesting a detailed display of information about a particular recommended good or service; and
   outputting for display on the customer's mobile device a detailed view of the selected recommended good or service alongside information about the corresponding business.

10. A recommendation management system for providing recommendations on behalf of a hotel business entity as a concierge service over a network to a hospitality customer having a mobile device comprising:
    a database that stores a plurality of recommendations approved by respective hotel business entities, the plurality of recommendations being for goods or services offered by a plurality of businesses and approved by the respective hotel business entities as recommendations for customers of the respective hotel business entities; and at least one processor configured to perform operations comprising:
receiving, via a connection, information about the location of a customer's mobile device;
determining a hotel business entity associated with the location of the customer's mobile device from the plurality of hotel business entities;
determining recommended goods or services in the stored recommendations for goods or services offered by a plurality of businesses at one or more different business locations and approved by the determined hotel business entity associated with the location of the customer's mobile device for display to customers of the determined hotel business entity as local recommendations; and
outputting for display as local recommendations on the customer's mobile device a listing of the recommended goods or services navigable by category or subcategory.

11. The recommendation management system recited in claim 10, wherein the at least one processor is further configured to perform operations comprising:
defining a list of recommendation categories or subcategories, each category or subcategory assigned to one or more goods or services currently offered by the plurality of businesses at the one or more business locations.

12. The recommendation management system recited in claim 10, wherein the at least one processor is further configured to perform operations comprising:
defining a set of users associated with a recommendation network that includes the hotel business entity and associated businesses.

13. The recommendation management system recited in claim 12, wherein the at least one processor is further configured to perform operations comprising:
adding a business to the recommendation network based on input received from a user; and
associating the added business with one or more categories or subcategories of goods or services.

14. The recommendation management system recited in claim 13, wherein the at least one processor is further configured to perform operations comprising:
receiving input from the user providing information about the business to be added;
generating a request to add the business to the recommendation network;
routing the request to add the business to one or more authorized users of the recommendation management system; and
receiving a set of data approving or declining to approve the request to add the business from the one or more authorized users.

15. The recommendation management system recited in claim 10, wherein the at least one processor is further configured to perform operations comprising:
receiving a selection from the customer's mobile device requesting a detailed display of information about a particular recommended good or service; and
outputting for display on the customer's mobile device a detailed view of the selected recommended good or service alongside information about the corresponding business.

16. A non-transitory computer-readable medium having one or more instructions stored thereon, that when executed by a computing device, cause the computing device to perform operations comprising:
storing in a recommendation management system a plurality of recommendations approved by respective hotel business entities, the plurality of recommendations being for goods or services offered by a plurality of businesses and approved by the respective hotel business entities as recommendations for customers of the respective hotel business entities;
establishing a connection with a customer's mobile device;
obtaining, via the connection, information about the location of the customer's mobile device;
determining a hotel business entity associated with the location of the customer's mobile device from the plurality of hotel business entities;
determining recommended goods or services in the stored recommendations for goods or services offered by a plurality of businesses at one or more different business locations and approved by the determined hotel business entity associated with the location of the customer's mobile device for display to customers of the determined hotel business entity as local recommendations; and
outputting for display as local recommendations on the customer's mobile device a listing of the recommended goods or services navigable by category or subcategory.

17. The non-transitory computer-readable medium recited in claim 16, the operations further comprising:
defining a list of recommendation categories or subcategories, each category or subcategory assigned to one or more goods or services currently offered by the plurality of businesses at the one or more business locations.

18. The non-transitory computer-readable medium recited in claim 16, the operations further comprising:
defining a set of users associated with a recommendation network that includes the hotel business entity and associated businesses.

19. The non-transitory computer-readable medium recited in claim 18, the operations further comprising:
adding a business to the recommendation network based on input received from a user; and
associating the added business with one or more categories or subcategories of goods or services.

20. The non-transitory computer-readable medium recited in claim 19, the operations further comprising:
receiving input from the user providing information about the business using an interactive console;
requesting to add the business to the recommendation network based on the input provided by using the interactive console;
routing the request to add the business to one or more authorized users of the recommendation management system; and
receiving a set of data approving or declining to approve the request to add the business from the one or more authorized users.

21. The non-transitory computer-readable medium recited in claim 16, the operations further comprising:
ranking the goods or services currently offered by the plurality of businesses based on proximity to the location of the customer's mobile device.

22. The non-transitory computer-readable medium recited in claim 16, the operations further comprising:
receiving a selection from the customer's mobile device requesting a detailed display of information about a particular recommended good or service; and outputting for display on the customer's mobile device a detailed view of the selected recommended good or service alongside information about the corresponding business.

\* \* \* \* \*